US009369240B2

(12) United States Patent
Pirskanen et al.

(10) Patent No.: US 9,369,240 B2
(45) Date of Patent: Jun. 14, 2016

(54) METHOD AND APPARATUS FOR PROVIDING A TRANSMISSION OPPORTUNITY

(71) Applicant: Broadcom Corporation, Irvine, CA (US)

(72) Inventors: Juho Mikko Oskari Pirskanen, Kangasala (FI); Anna Pantelidou, Oulu (FI)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 14/162,852

(22) Filed: Jan. 24, 2014

(65) Prior Publication Data

US 2015/0236822 A1  Aug. 20, 2015

(30) Foreign Application Priority Data

Jan. 24, 2013  (GB) .................................. 1301293.5

(51) Int. Cl.
*G01R 31/08* (2006.01)
*H04L 1/18* (2006.01)
*H04W 72/04* (2009.01)
*H04W 74/08* (2009.01)
*H04W 84/12* (2009.01)

(52) U.S. Cl.
CPC ........... *H04L 1/1812* (2013.01); *H04W 72/044* (2013.01); *H04W 74/08* (2013.01); *H04W 84/12* (2013.01)

(58) Field of Classification Search
CPC ....... H04L 1/18; H04L 1/1812; H04L 1/1825; H04L 1/1864; H04W 72/04; H04W 72/044; H04W 74/08
See application file for complete search history.

(56) References Cited

U.S. PATENT DOCUMENTS

2010/0329202 A1* 12/2010 Sun .................... H04W 72/1215
370/329
2014/0119288 A1* 5/2014 Zhu ................... H04W 74/0816
370/329

FOREIGN PATENT DOCUMENTS

KR    1020100081048 A    7/2010

* cited by examiner

*Primary Examiner* — Anh Ngoc Nguyen
(74) *Attorney, Agent, or Firm* — Oblon, McClelland, Maier & Neustadt, L.L.P.

(57) ABSTRACT

A method, apparatus and computer program product are provided for use in a communication device. The method may add a transmission type identifier to a transmission opportunity (TXOP) request packet, wherein the transmission type identifier includes one or more bits indicating a request for either Hybrid Automatic Repeat Request (HARQ) operation or for non-HARQ operation. The method may further causes the communication device to transmit the TXOP request packet to a TXOP responder and receives a subsequent transmission from the TXOP responder indicating acceptance, modified acceptance, or rejection of the request. A corresponding apparatus and computer program product are also provided.

20 Claims, 20 Drawing Sheets

FIGURE 9a

QoS Info Field when sent by an AP

| B0 | B1 | B2 | B3 | B4 | B5 | B6 |
|----|----|----|----|----|----|----|
| EDCA parameter Set Update Count | | | Q-Ack | Queue Request | TXOP Request | Reserved |

Alternative coding format for QoS Info Field indicating HARQ when sent by an AP

| B0 | B1 | B2 | B3 | B4 | B5 | B6 |
|----|----|----|----|----|----|----|
| EDCA parameter Set Update Count | | | Q-Ack | Queue Request | TXOP Request | HARQ Support |

Alternative coding format for QoS Info Field indicating HARQ when sent by an AP

| B0 | B1 | B2 | B3 | B4 | B5 | B6 |
|----|----|----|----|----|----|----|
| EDCA parameter Set Update Count | | | Q-Ack | Queue Request | TXOP Request | Extended |
| HARQ Suppor | Reserved or other parameters | | | | | |

QoS Info Field when sent by a non-AP STA

| B0 | B1 | B2 | B3 | B4 | B5 | B6 | B7 |
|---|---|---|---|---|---|---|---|
| AC_VO U-APSD Flag | AC_VI U-APSD Flag | AC_BK U-APSD Flag | AC_BE U-APSD Flag | Q-Ack | Max SP Length | | More Data Ack |

FIGURE 10b

QoS Info Field when sent by a non-AP STA indicating HARQ capabilities

| B0 | B1 | B2 | B3 | B4 | B5 | B6 | B7 |
|---|---|---|---|---|---|---|---|
| AC_VO U-APSD Flag | AC_VI U-APSD Flag | AC_BK U-APSD Flag | AC_BE U-APSD Flag | Q-Ack | Max SP Length | | More Data Ack |
| HARQ Support | Reserved or other parameters | | | | | | |

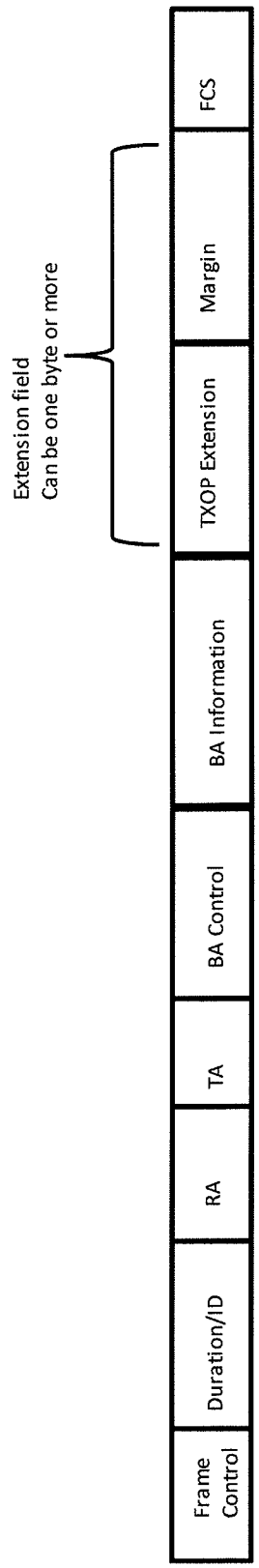
FIGURE 18  Block ACK within a HARQ TXOP

FIGURE 19b Extension of the Table 8-214—ADDBA Response frame Action field format

| Order | Information |
|---|---|
| 1 | Category |
| 2 | Block Ack Action |
| 3 | Dialog Token |
| 4 | Status Code |
| 5 | Block Ack Parameter Set |
| 6 | Block Ack Timeout Value |
| 7 | GCR Group Address element (optional) |
| 8 | HARQ info |

FIGURE 19a Extension of the Table 8-213—ADDBA Request frame Action field format

| Order | Information |
|---|---|
| 1 | Category |
| 2 | Block Ack Action |
| 3 | Dialog Token |
| 4 | Block Ack Parameter Set |
| 5 | Block Ack Timeout Value |
| 6 | Block Ack Starting Sequence Control |
| 7 | GCR Group Address element (optional) |
| 8 | HARQ info |

METHOD AND APPARATUS FOR PROVIDING A TRANSMISSION OPPORTUNITY

CROSS-REFERENCE TO RELATED APPLICATIONS

This application claims priority to U.K. Patent Application No. 1301293.5, filed Jan. 24, 2013, the entirety of which is incorporated herein by reference.

TECHNOLOGICAL FIELD

Embodiments of the present invention relate generally to communications technology and, more particularly, to improving transmission opportunities using Hybrid Automatic Repeat Request protocol.

BACKGROUND

In some cases, channels for wireless local area network (WLAN) transmission opportunity (TXOP) functionality are reserved for a certain transmitter-receiver pair for a defined time period, such as in Institute of Electrical and Electronics Engineers (IEEE™) 802.11-based networks that otherwise operate according to Distributed Coordinated Function (DCF) rules. In such networks, an access point (AP) or station (STA) that has gained the TXOP is called the TXOP holder and it sends frames to another STA or AP, which is the TXOP responder. During these TXOPs, multiple frames can be transmitted sequentially, spaced by a Short Interframe Space (SIFS) duration. Since upon obtaining a TXOP, the TXOP holder can transmit multiple packets one after the other without the need to contend again for medium access, TXOP operation can significantly improve the system capacity when compared to DCF-based channel access. There are several types of TXOPs that can be obtained, such as, for example, Hybrid Coordination Function (HCF) Enhanced Distributed Channel Access TXOPs (EDCA TXOPs) and HCF Control Channel Access TXOPs (HCCA TXOPs) in a Basic Service Set (BSS) network, HCF EDCA TXOPs in an Independent Basic Service Set (IBSS) network, and TXOP operation in a Wireless Mesh Network (WMN).

In HCF, the Hybrid Coordinator (HC) controls the bandwidth by allocating multiple transmission opportunities to the STAs. TXOPs are obtained either by regular channel contention in EDCA or by the Hybrid Coordinator in HCCA. During a mesh peer service period, a mesh STA may obtain multiple TXOPs in a single direction. Similarly, other network operation modes may reserve the channel for multiple transmissions that are spaced apart by a given duration.

In addition, Hybrid Automatic Repeat Request (HARQ) protocol has been used in cellular systems when a transmission is contention free, meaning that each transmitter and receiver pair has dedicated resources to be used for transmission. With dedicated resources, a receiver is able to assume that it is the intended recipient of any received transmission and retransmission. In such cases, even if a transmitted packet is not decoded correctly, the receiver may be configured to keep the received information of the transmitted packet in its memory and send a Negative Acknowledgement (NACK) to the transmitter to request re-transmission. During the reception of the retransmission, the receiver may use both the first transmission and the re-transmission(s) by combining them together based on the configured HARQ to decode the packet correctly.

HARQ principles referred to as cache-combining and incremental redundancy may be used in cellular systems. In cache-combining, each transmitter packet may be self-decodable and the receiver is configured to sum the signal energy of each transmission. In incremental redundancy, a retransmission contains additional redundancy information to improve Forward Error Correction (FEC) and channel coding results.

In this fashion, HARQ can employ link adaptation more aggressively, since the effect of packet transmission failure is smaller and the combination of separate transmissions is possible. For example, a typical operation point of link adaptation with HARQ is 10% of Block Error Rate (BLER), where 90% of transmissions go through with an aggressive Modulation and Coding Scheme (MCS) setting and the remaining 10% is recovered with relatively few re-transmissions.

Due to the way that channels are allocated in existing 802.11-based networks and the fact that a transmission and its retransmission(s) are completely independent of each other, HARQ protocols have not been implemented in contention-based transmissions.

BRIEF SUMMARY

A method, apparatus and computer program product are provided according to one embodiment of the present invention in order to facilitate the use of HARQ operation in random access, contention based channels.

In one embodiment, a method is provided that adds a transmission type identifier to a transmission opportunity (TXOP) request packet, wherein the transmission type identifier includes one or more bits indicating a request for either Hybrid Automatic Repeat Request (HARQ) operation or for non-HARQ operation. The method of this embodiment further causes the communication device to transmit the TXOP request packet to a TXOP responder and to receive a subsequent transmission from the TXOP responder indicating acceptance, modified acceptance, or rejection of the request.

In an additional embodiment, the method adds a size identifier to the TXOP request packet, wherein the size identifier includes one or more bits indicating a requested TXOP duration. In another embodiment, the subsequent transmission further indicates an allocated TXOP duration equal to or smaller than the requested TXOP duration. In another embodiment, the method causes the communication device to transmit data packets for a TXOP duration allocated by the TXOP responder using the transmission type indicated in the subsequent transmission. The method of another embodiment causes the communication device to transmit a request to extend the allocated TXOP duration to the TXOP responder. In another embodiment, the method receives a block acknowledgment frame from the TXOP responder indicating a margin by which to extend the allocated TXOP duration. In one such embodiment, the margin allows time for a predetermined number of re-transmissions, a predetermined time interval, or an arbitrary number corresponding to a number of retransmissions or time. In another embodiment, in an instance in which the communication device has completed data packet transmission prior to the end of the allocated TXOP duration, the method further causes the communication device to transmit a message to the TXOP responder ending the TXOP. In yet another embodiment, an allocated TXOP duration may not exceed a maximum TXOP duration determined by the TXOP responder. In another embodiment of the method, an allocated TXOP duration may be extended to exceed a maximum duration determined by the TXOP responder to complete retransmissions. In another embodiment of the method, the subsequent transmission further indicates a number of packets that the communication device may transmit to the TXOP responder before waiting to receive a block acknowledgment. In one embodiment, modified acceptance of the request indicates allocation of a TXOP with an alternative transmission type. In another embodiment, the TXOP responder comprises an 802.11 access point. In another embodiment, in an instance in which the subsequent transmission allocated a HARQ TXOP, the method causes the communication device to transmit a message to the TXOP responder indicating a request to change the transmission type to a normal TXOP. In one embodiment, in an instance in which the subsequent transmission indicated rejection of the request, the method further causes the communication device to set a network allocation vector (NAV) based on the subsequent transmission, the NAV identifying a period during which the communication device will not transmit packets to the TXOP responder.

In another embodiment, an apparatus is provided for use in a communication device, including a processing system arranged to cause the apparatus to add a transmission type identifier to a transmission opportunity (TXOP) request packet. In this embodiment, the transmission type identifier includes one or more bits indicating a request for either hybrid automatic repeat request (HARQ) operation or for normal operation. The processing system is further arranged to cause the apparatus to cause transmission of the TXOP request packet to a TXOP responder and to receive a subsequent transmission from the TXOP responder indicating acceptance, modified acceptance, or rejection of the request.

In another embodiment, a computer readable medium is provided having a set of instructions which, when executed by a communication device, causes the communication device to add a transmission type identifier to a transmission opportunity (TXOP) request packet. In this embodiment, the transmission type identifier includes one or more bits indicating a request for either hybrid automatic repeat request (HARQ) operation or for non-HARQ operation. The set of instructions further causes the communication device to transmit the TXOP request packet to a TXOP responder and receive a subsequent transmission from the TXOP responder indicating acceptance, modified acceptance, or rejection of the request.

In another embodiment, an apparatus is provided for use in a communication device, the apparatus having means for adding a transmission type identifier to a transmission opportunity (TXOP) request packet. In this embodiment, the transmission type identifier includes one or more bits indicating a request for either hybrid automatic repeat request (HARQ) operation or for normal operation. The apparatus further includes means for causing transmission of the TXOP request packet to a TXOP responder and means for receiving a subsequent transmission from the TXOP responder indicating acceptance, modified acceptance, or rejection of the request.

In another embodiment, a method is provided for use by a communication device. The method of this embodiment receives a transmission opportunity (TXOP) request packet from a TXOP requestor, the TXOP request packet containing a transmission type identifier that includes one or more bits indicating a request for either hybrid automatic repeat request (HARQ) operation or for non-HARQ operation. The method further determines whether to allocate a TXOP to the TXOP requestor using the requested transmission type and causes transmission of a response to the TXOP requestor indicating acceptance, modified acceptance, or rejection of the request.

In one such embodiment, the header of the TXOP request packet has a size identifier that includes one or more bits indicating a requested TXOP duration. In another, a method is provided that determines a TXOP duration to allocate to the TXOP requestor. In this embodiment, the allocated TXOP duration is equal to or smaller than the requested TXOP duration and the response further indicates the allocated TXOP duration. In another embodiment, determining a TXOP duration to allocate to the TXOP requestor includes determining, from the TXOP request packet, a class of data to be transmitted, calculating a maximum TXOP duration based on the class of data and the allocated transmission type, in an instance in which the requested TXOP duration is less than or equal to the maximum TXOP duration, allocating the requested TXOP duration, and in an instance in which the requested TXOP duration is greater than the maximum TXOP duration, allocating the maximum TXOP duration. The method of another embodiment receives data packets using the transmission type indicated in the response for a TXOP duration allocated by the communication device. In another embodiment, the method receives a request to extend the allocated TXOP duration from the TXOP requestor, and, in an instance in which the allocated TXOP duration is less than the maximum TXOP duration, causes the communication device to transmit a block acknowledgment frame to the TXOP requestor, the block acknowledgment frame indicating a margin by which to extend the allocated TXOP duration. In yet another embodiment of the method, the margin allows time for a predetermined number of re-transmissions, a predetermined time interval, or an arbitrary number corresponding to a number of retransmissions or time. In another embodiment of the method, an allocated TXOP duration may not exceed a maximum TXOP duration determined by the communication device. In another embodiment, the method further determines, upon expiration of the allocated TXOP duration, whether any retransmissions are necessary, and, in an instance in which retransmissions are necessary, causes the communication device to transmit a block acknowledgment frame to the TXOP requestor, the block acknowledgment frame indicating a margin by which to extend the allocated TXOP duration. In another embodiment of the method, the margin allows time for a predetermined number of re-transmissions, a predetermined time interval, or an arbitrary number corresponding to a number of retransmissions or time. In one embodiment of the method, the response further indicates a number of packets that the communication device may transmit to the TXOP responder before waiting to receive a block acknowledgment. In another, modified acceptance of the request indicates allocation of a TXOP with an alternative transmission type. In yet another, the communication device is an 802.11 access point. In another embodiment, in an instance in which the response allocated a HARQ TXOP, the method further receives a message from the TXOP requestor indicating a request to change the transmission type to a normal TXOP.

In another embodiment, an apparatus is provided for use in a communication device, including a processing system arranged to cause the apparatus to at least receive a transmission opportunity (TXOP) request packet from a TXOP requestor, the TXOP request packet containing a header having a transmission type identifier that includes one or more bits indicating a request for either hybrid automatic repeat request (HARQ) operation or for normal operation. In this embodiment, the processing system is further arranged to determine whether to allocate a TXOP to the TXOP requestor using the requested transmission type and cause transmission of a response to the TXOP requestor indicating acceptance, modified acceptance, or rejection of the request.

In another embodiment, a computer readable medium is provided having a set of instructions which, when executed by a communication device, causes the communication device to receive a transmission opportunity (TXOP) request packet from a TXOP requestor, the TXOP request packet containing a transmission type identifier that includes one or more bits indicating a request for either hybrid automatic repeat request (HARQ) operation or for non-HARQ operation. In this embodiment, the set of instructions further cause the device to determine whether to allocate a TXOP to the TXOP requestor using the requested transmission type, and causes transmission of a response to the TXOP requestor indicating acceptance, modified acceptance, or rejection of the request.

In yet another embodiment, an apparatus is provided for use in a communication device. In this embodiment, the apparatus includes means for receiving a transmission opportunity (TXOP) request packet from a TXOP requestor, the TXOP request packet containing a header having a transmission type identifier that includes one or more bits indicating a request for either hybrid automatic repeat request (HARQ) operation or for normal operation. The apparatus further includes means for determining whether to allocate a TXOP to the TXOP requestor using the requested transmission type and means for causing transmission of a response to the TXOP requestor indicating acceptance, modified acceptance, or rejection of the request.

BRIEF DESCRIPTION OF THE DRAWINGS

Figure 1:
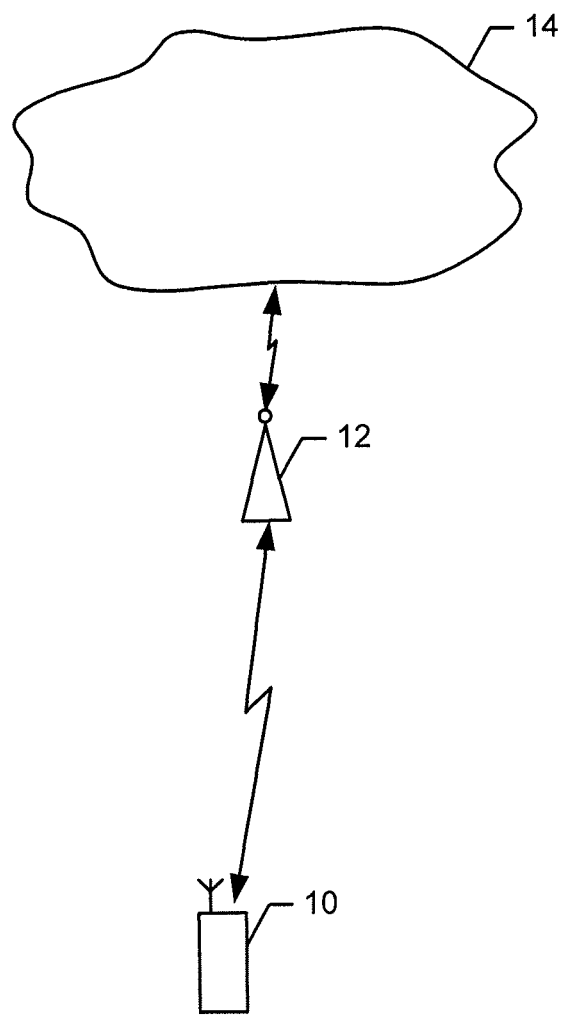
Figure 2:
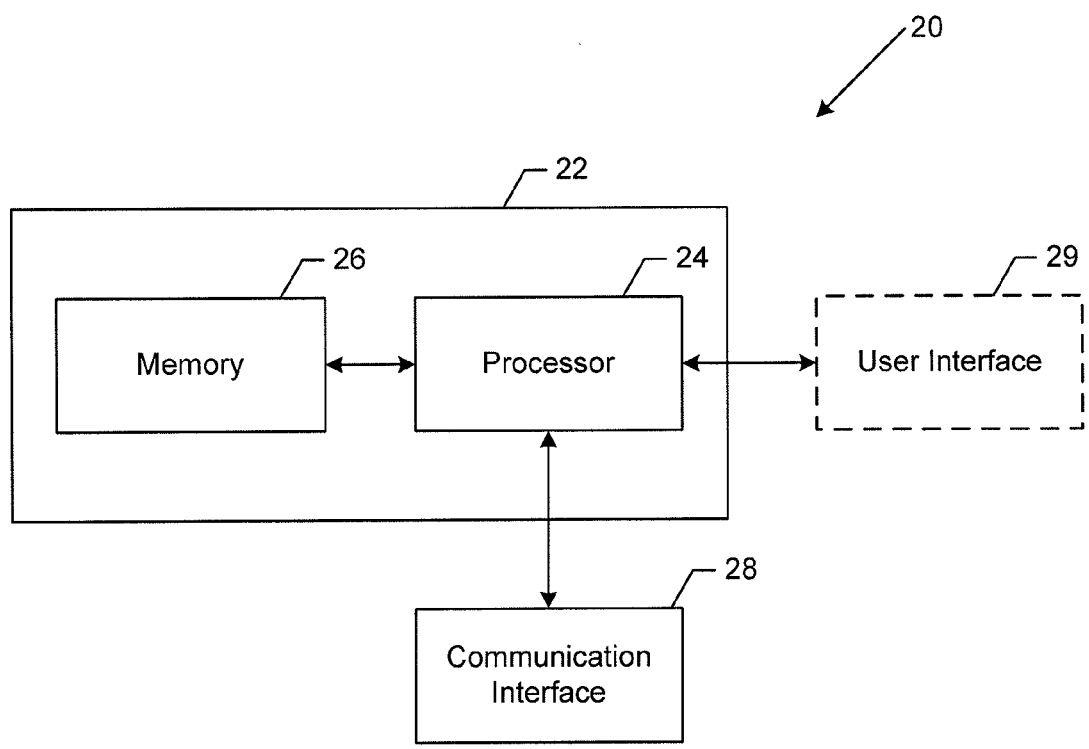
Figure 3:
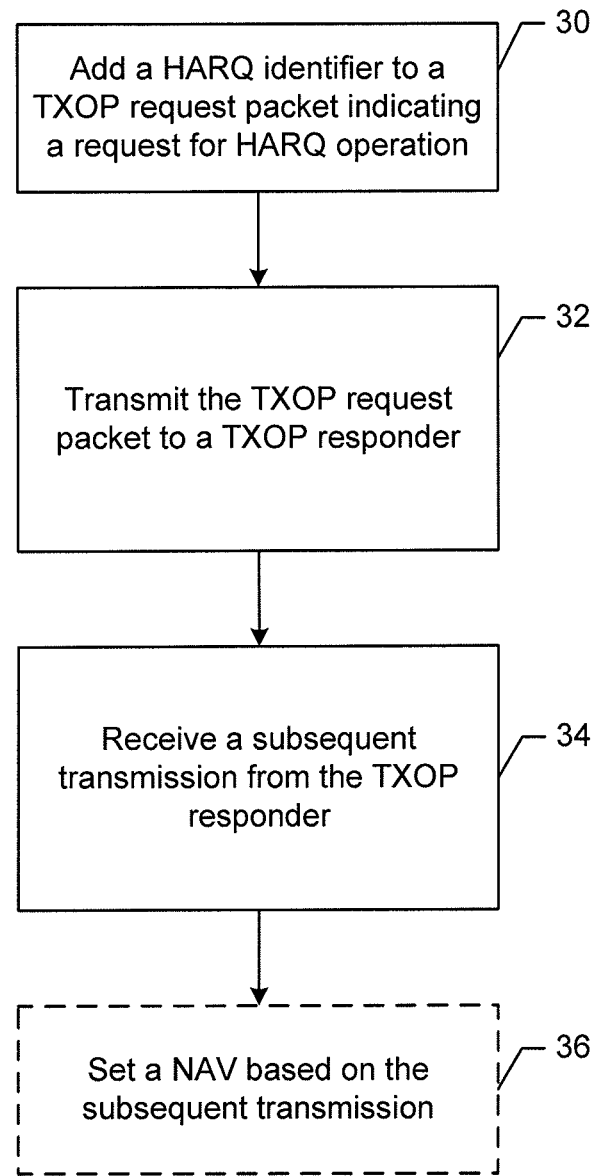
Figure 4:
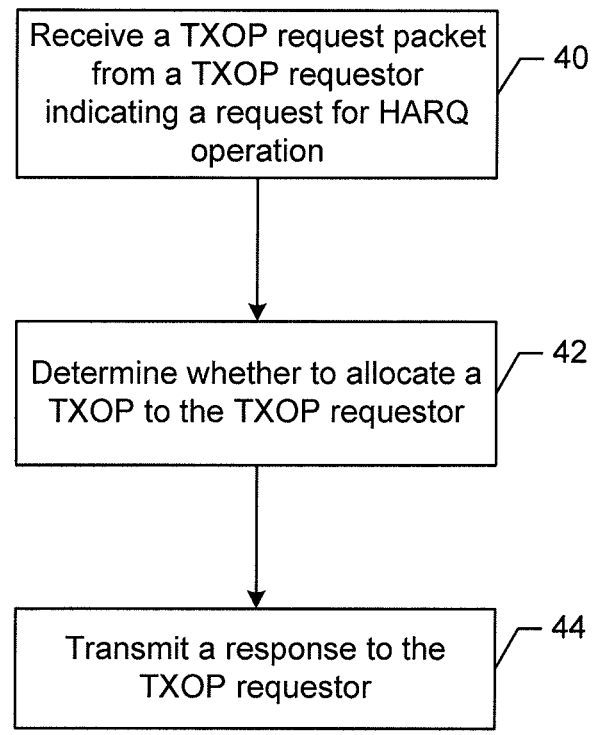
Figure 5:
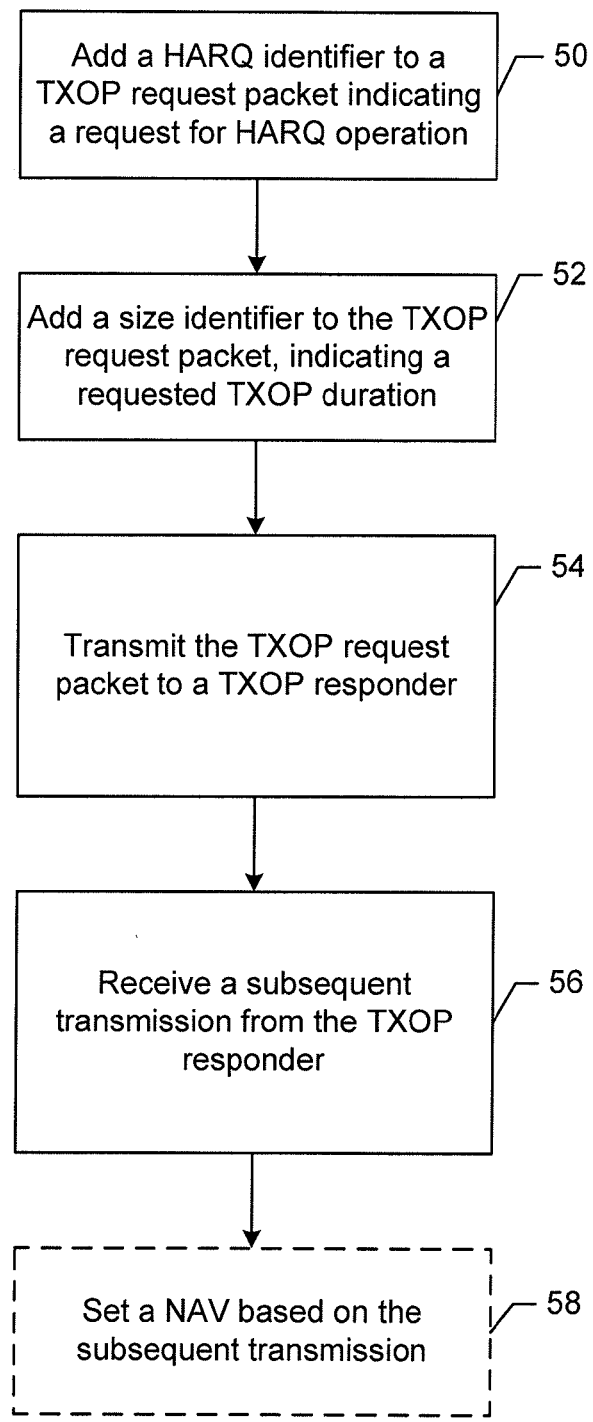
Figure 6:
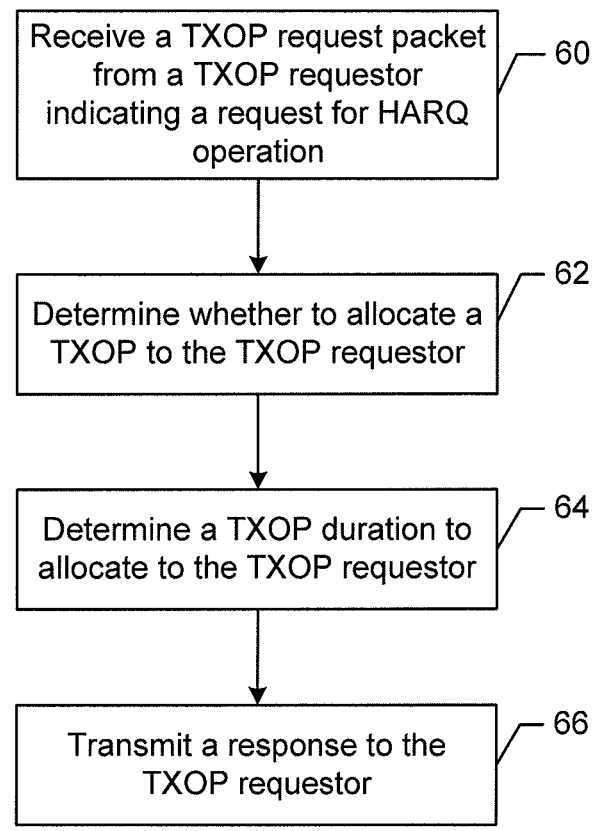
Figure 7:
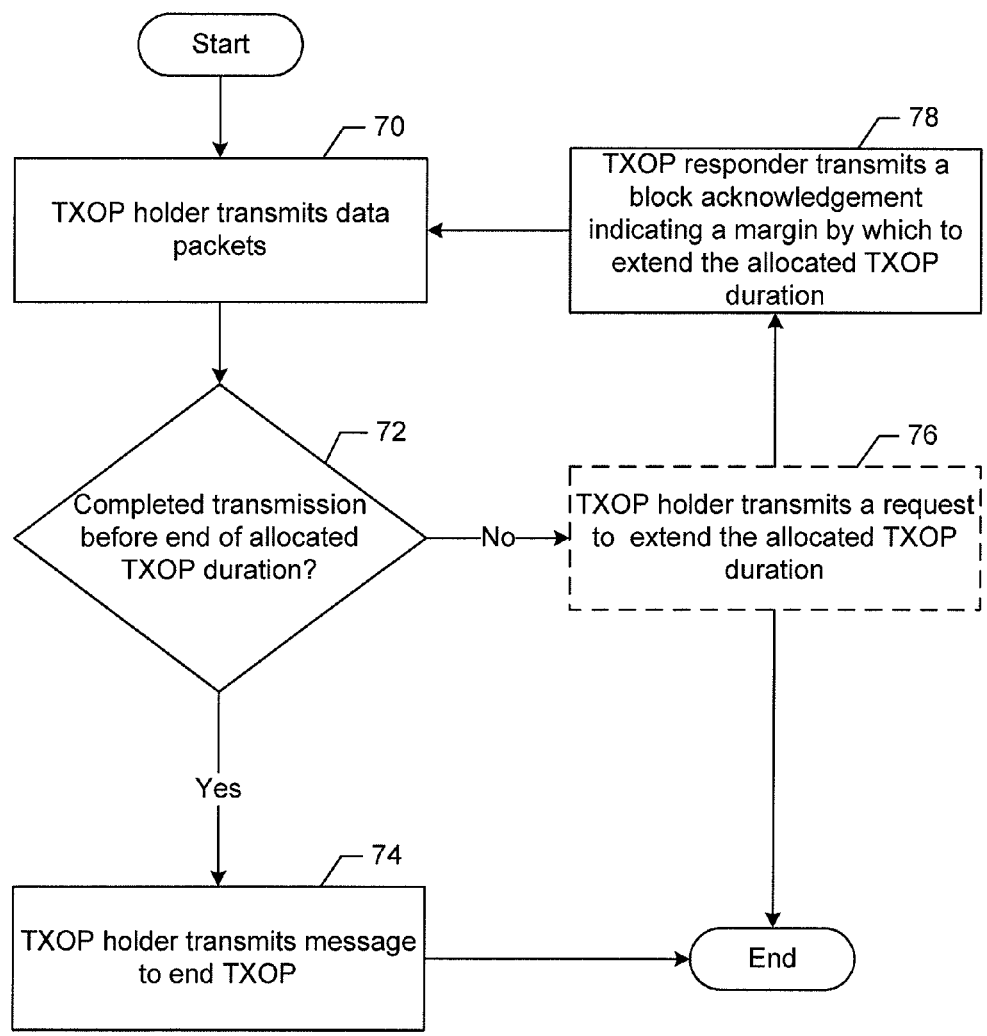
Figure 8:
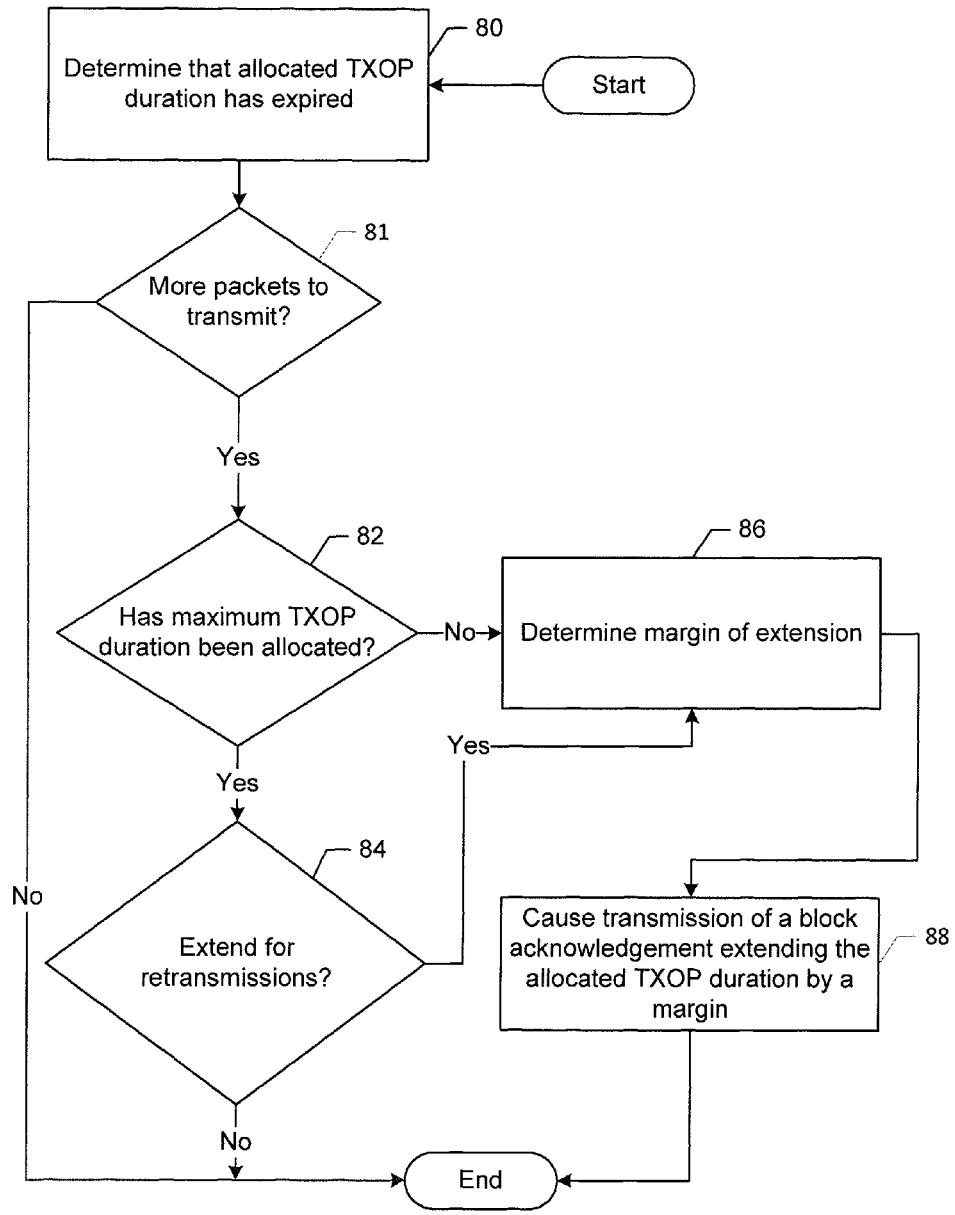
Figure 11:
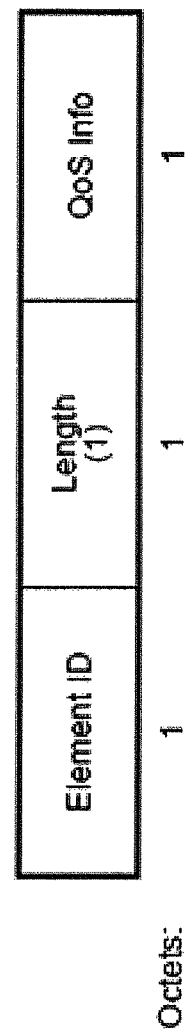
Figure 12A:
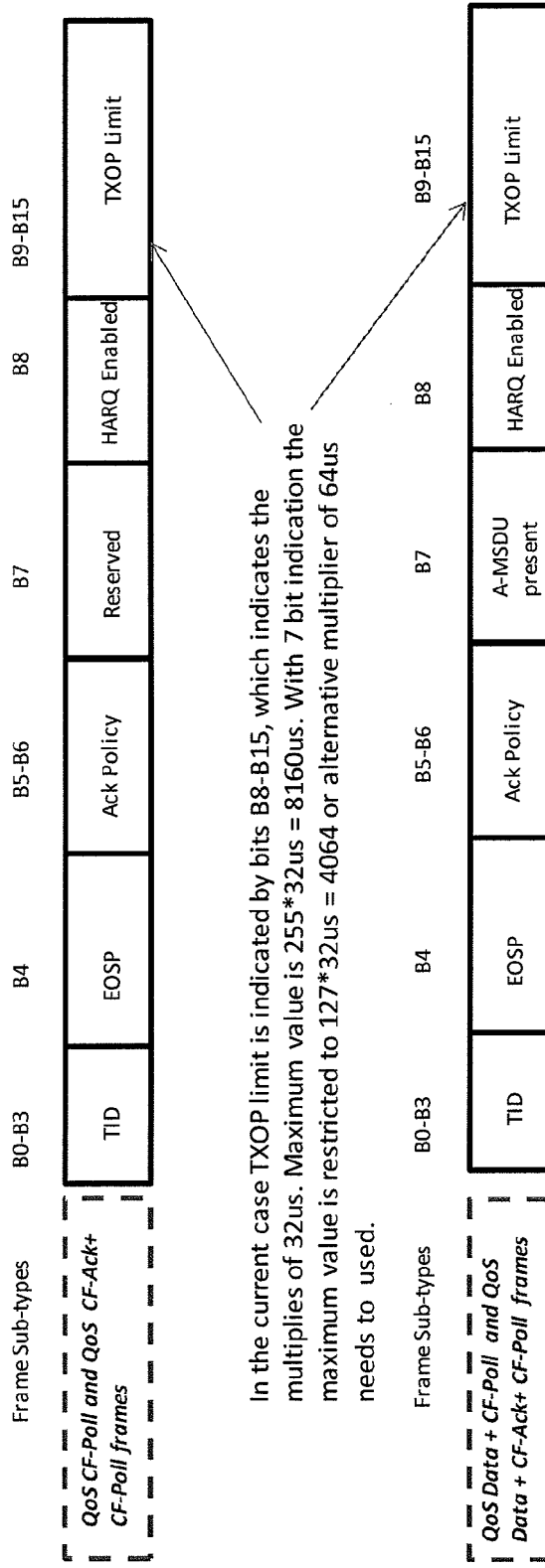
Figure 12B:
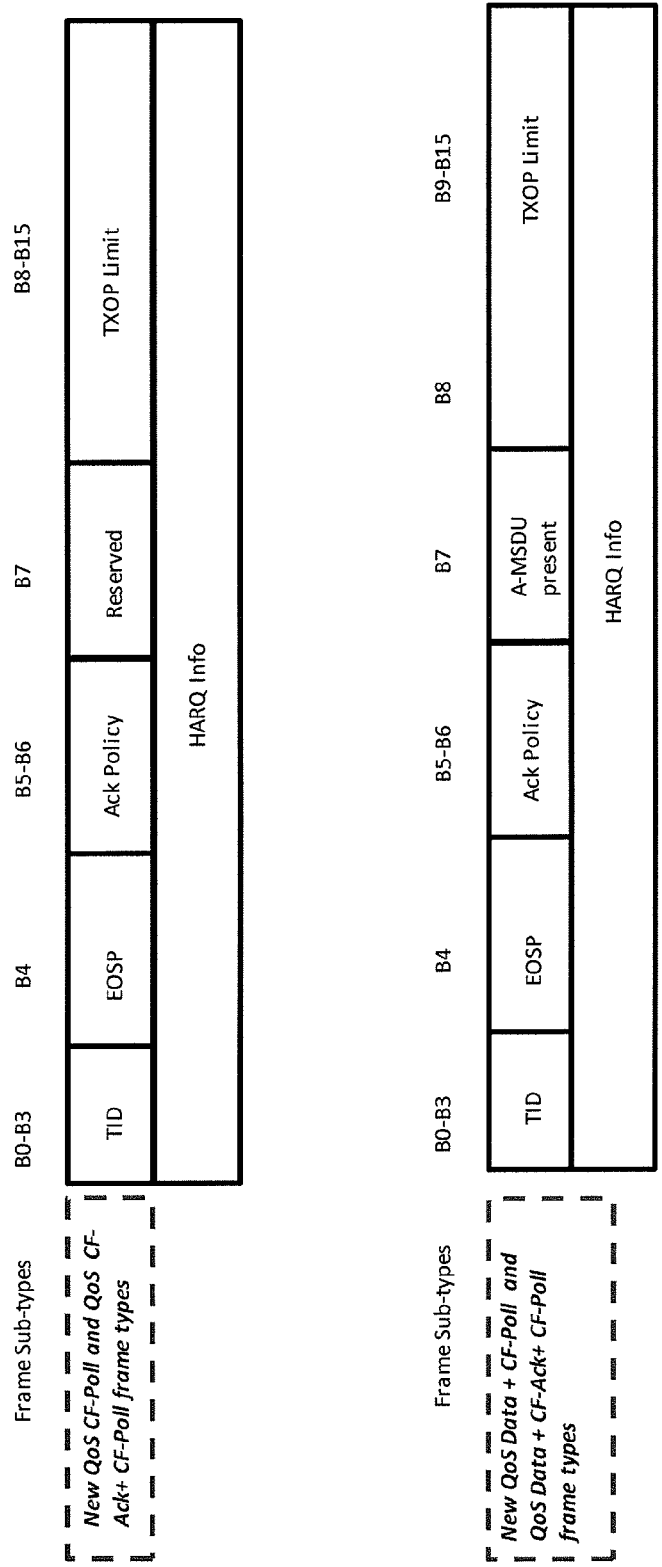
Figure 13:
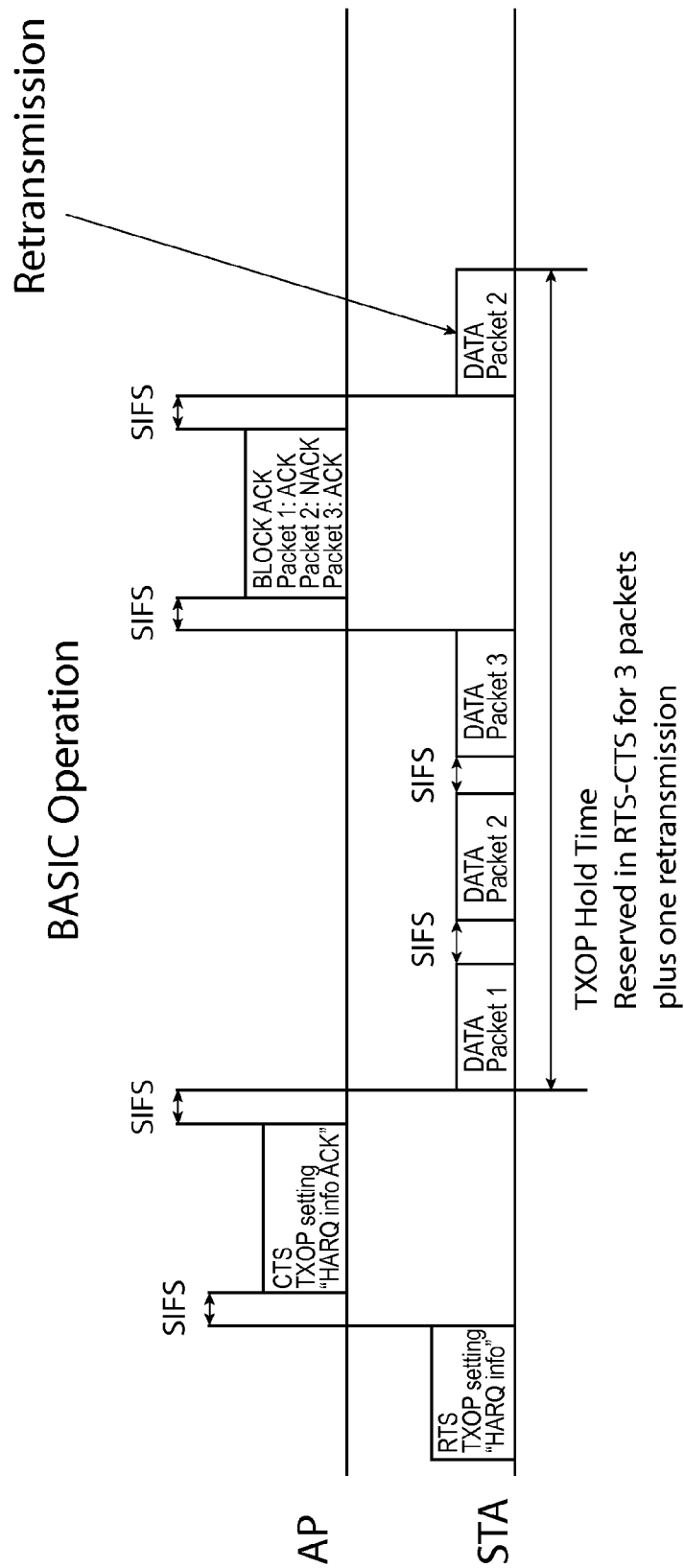
Figure 14:
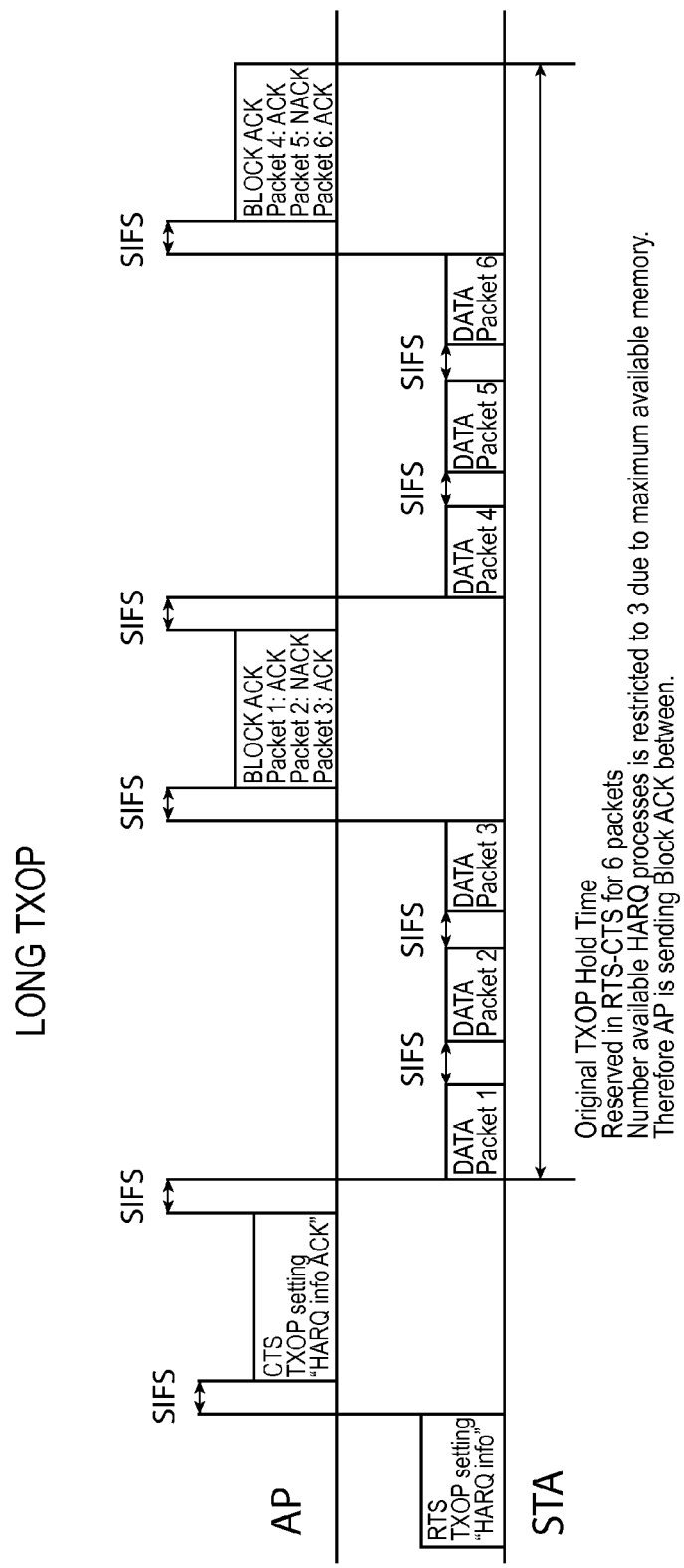
Figure 15:
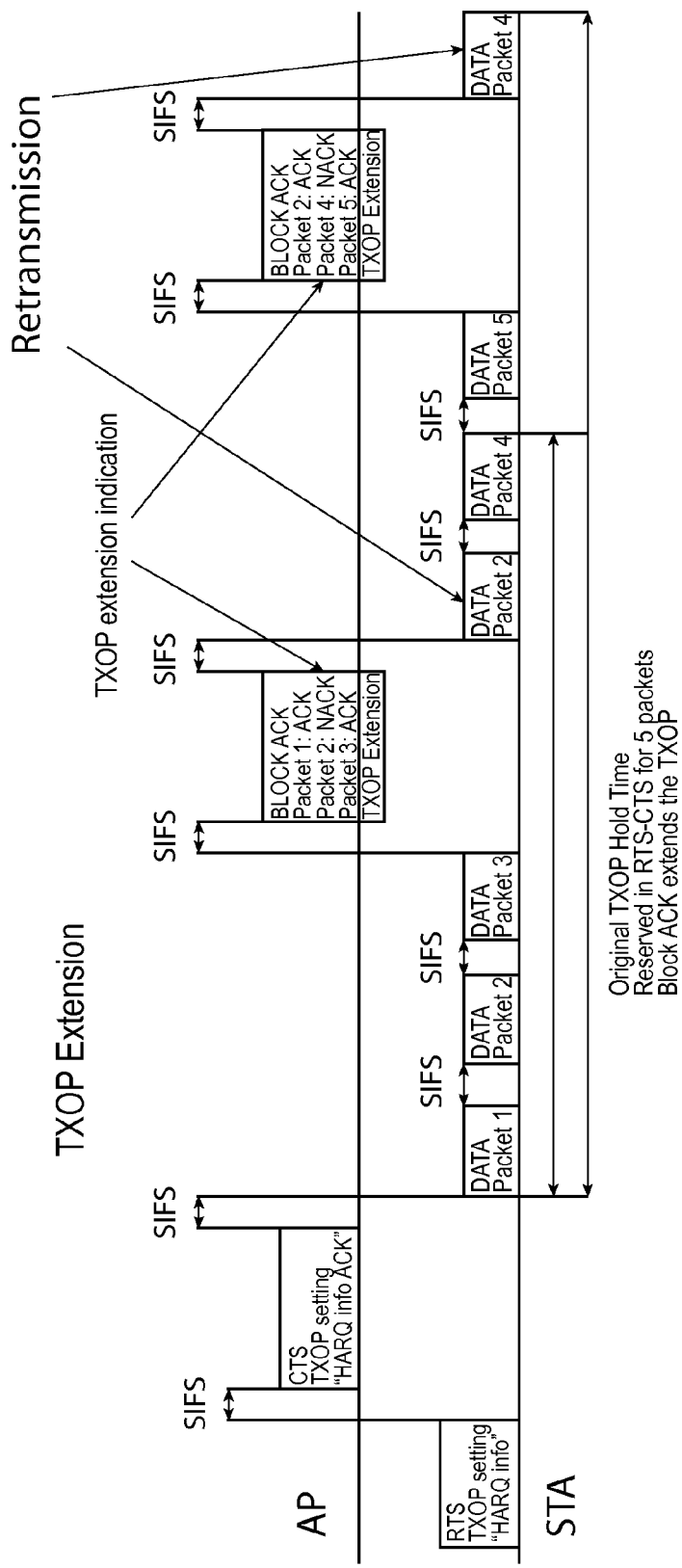
Figure 16:
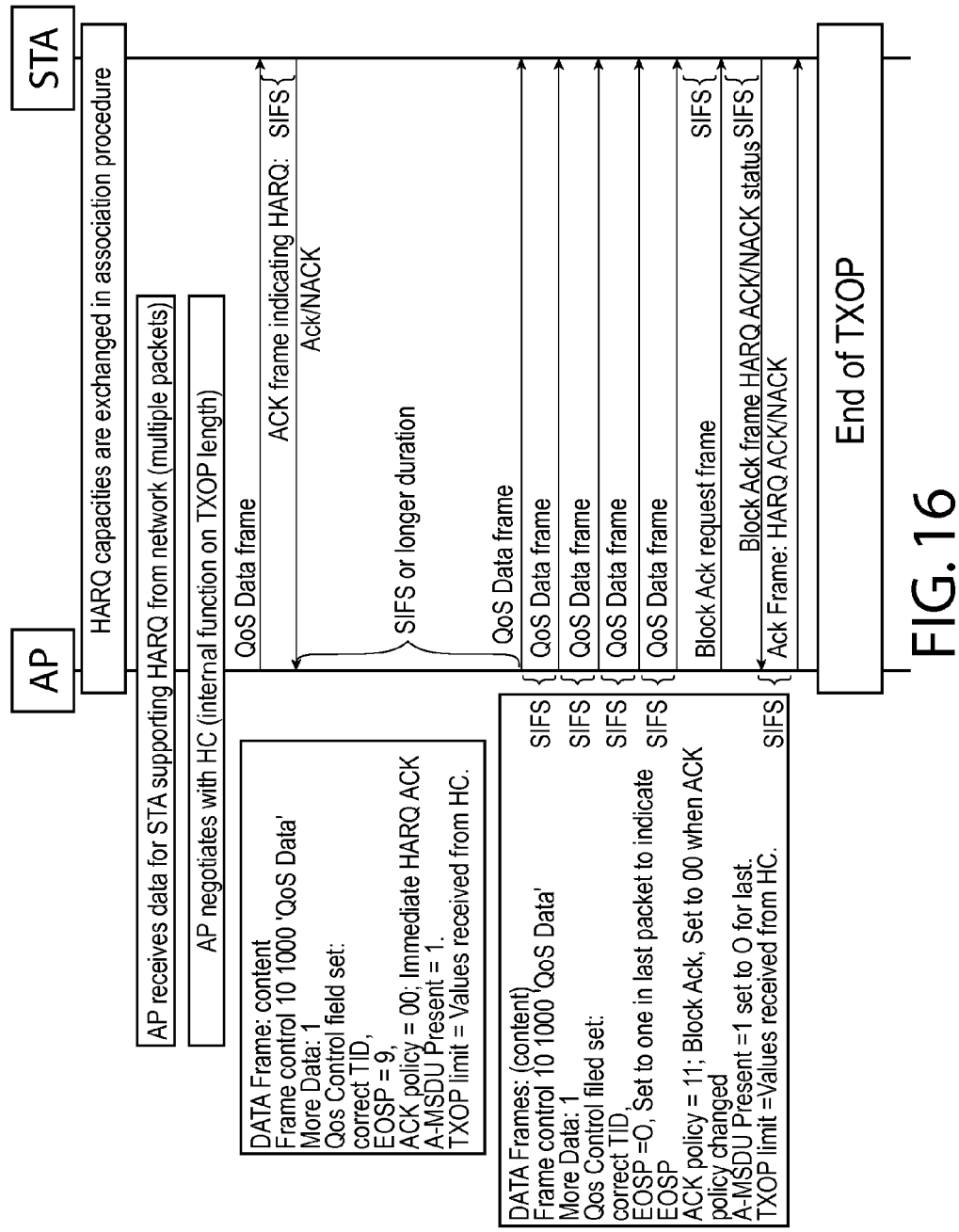
Figure 17:
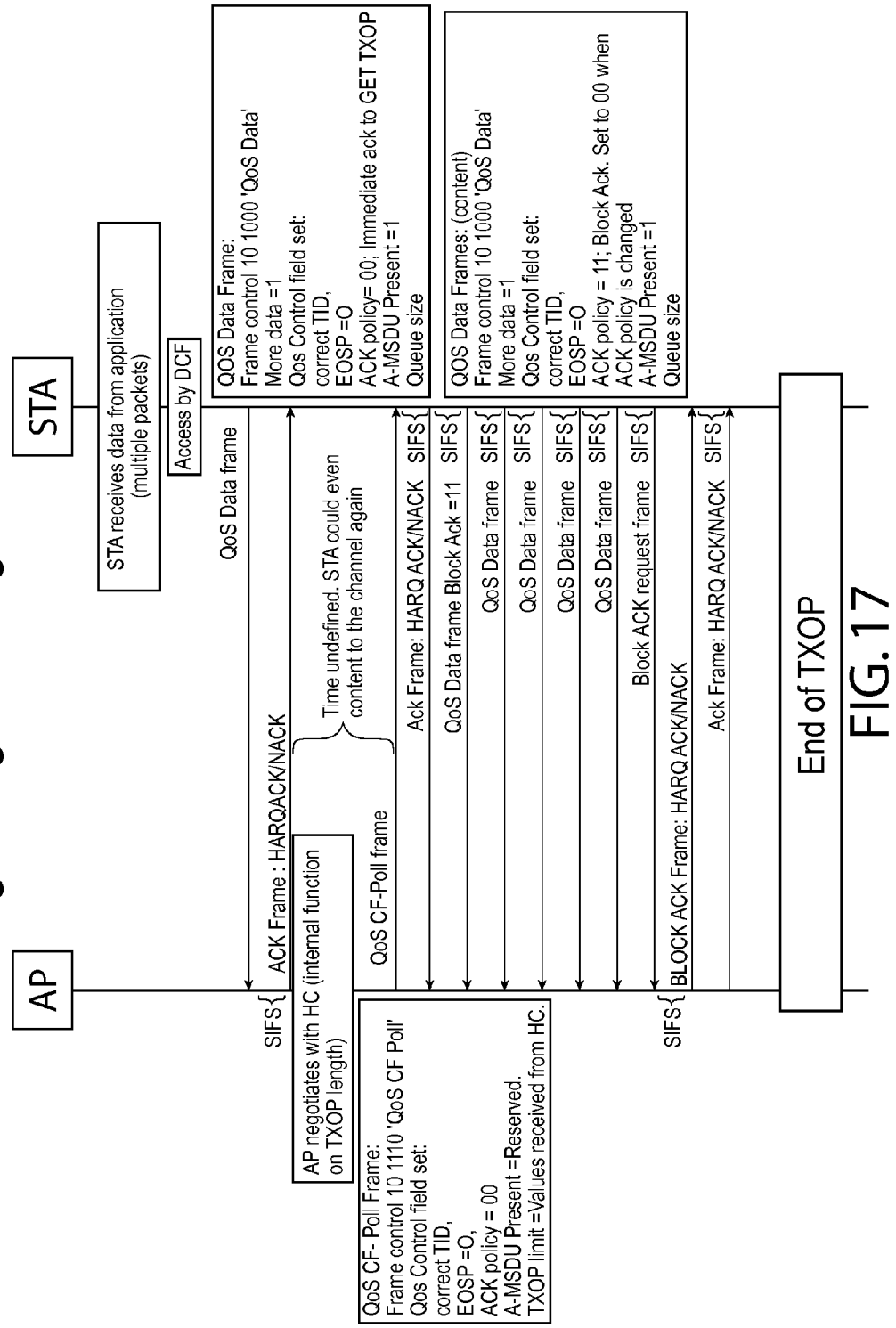

Having thus described the example embodiments of the invention in general terms, reference will now be made to the accompanying drawings, which are not necessarily drawn to scale, and wherein:

FIG. 1 is a schematic representation of a system having a communication device that may enable HARQ and that may benefit from example embodiments of the present invention;

FIG. 2 is a block diagram of an apparatus that may be embodied by a communication device and/or an access point in accordance with some example embodiments of the present invention;

FIG. 3 is a flow chart illustrating operations performed by an example TXOP requestor in accordance with some example embodiments of the present invention;

FIG. 4 is a flow chart illustrating example operations performed by an example TXOP responder in accordance with some example embodiments of the present invention;

FIG. 5 is a flow chart illustrating further operations performed by an example TXOP requestor in accordance with some example embodiments of the present invention;

FIG. 6 is a flow chart illustrating example operations performed by an example TXOP responder in accordance with some example embodiments of the present invention;

FIG. 7 is a flow chart illustrating example operations performed by a TXOP holder and a TXOP responder in accordance with some example embodiments of the present invention;

FIG. 8 is a flow chart illustrating example operations performed by an example TXOP responder in accordance with some example embodiments of the present invention;

FIG. 9a illustrates a Quality of Service Info Field sent by an AP in accordance with the 802.11 version 2012 standard;

FIG. 9b illustrates a Quality of Service Info Field sent by an AP in accordance with some example embodiments of the present invention;

FIG. 9c illustrates another Quality of Service Info Field sent by an AP in accordance with some example embodiments of the present invention;

FIG. 10a illustrates a Quality of Service Info Field sent by a non-AP STA in accordance with the 802.11 version 2012 standard;

FIG. 10b illustrates a Quality of Service Info Field set by a non-AP STA in accordance with some example embodiments of the present invention;

FIG. 11 illustrates a Quality of Service Capability Field in accordance with the 802.11 version 2012 standard;

FIGS. 12a and 12b illustrate a Quality of Service Control Field sent by an HC located at the AP. The HC is the TXOP responder in an instance in which the TXOP is initiated by a STA in accordance with some example embodiments of the present invention;

FIG. 13 illustrates an example HARQ TXOP transmission sequence in accordance with some example embodiments of the present invention;

FIG. 14 illustrates another example HARQ TXOP transmission sequence in accordance with some example embodiments of the present invention;

FIG. 15 illustrates yet another example HARQ TXOP transmission sequence in accordance with some example embodiments of the present invention;

FIG. 16 illustrates an example HARQ TXOP transmission sequence where an AP is the HARQ TXOP holder transmitting packets to a STA in the downlink direction including an association procedure in accordance with some example embodiments of the present invention;

FIG. 17 illustrates an example HARQ TXOP transmission sequence including a CF-Poll frame transmission where the HARQ TXOP holder is a STA transmitting packets in the uplink direction to the AP in accordance with some example embodiments of the present invention;

FIG. 18 illustrates an example modified Block ACK Field in accordance with some example embodiments of the present invention;

FIG. 19a illustrates an example ADDBA request frame Action field in accordance with some example embodiments of the present invention; and FIG. 19b illustrates an example ADDBA response frame Action field in accordance with some example embodiments of the present invention.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or application specific integrated circuit for a mobile phone or a similar integrated circuit in server, a cellular network device, or other network device.

Although the method, apparatus and computer program product may be implemented in a variety of different system architectures, one example of a system that may be specifically configured in order to implement an example embodiment of the present invention is shown in FIG. 1.

Referring now to FIG. 1, a system is shown that supports communications between a plurality of communication devices 10 (one of which is illustrated by way of example) and a network 14, such as an 802.11 network, a Long Term Evolution (LTE) network, an LTE-Advanced (LTE-A) network, a Global Systems for Mobile communications (GSM) network, a Code Division Multiple Access (CDMA) network, e.g., a Wideband CDMA (WCDMA) network, a CDMA2000 network or the like, a General Packet Radio Service (GPRS) network or other type of network, via an access point 12.

The network 14 may include a collection of various different nodes, devices or functions that may be in communication with each other via corresponding wired and/or wireless interfaces. For example, the network may include one or more cells, including access point 12 and which may serve a respective coverage area. The access point 12 could be, for example, part of one or more cellular or mobile networks or public land mobile networks (PLMNs). In turn, other devices such as processing devices (eg, personal computers, server computers or the like) may be coupled to the communication device 10 and/or other communication devices via the network.

A communication device, such as the communication device 10 (also known as user equipment (UE), a mobile terminal or the like), may be in communication with other communication devices or other devices via the access point 12 and, in turn, the network 14. In some cases, the communication device 10 may include an antenna for transmitting signals to and for receiving signals from an access point 12. As is described herein the communication device 10 and/or the access point 12 may take the form of a transmitter and/or receiver.

In some example embodiments, the communication device 10 may be a mobile communication device such as, for example, a mobile telephone, portable digital assistant (PDA), pager, laptop computer, STA, or any of numerous other hand held or portable communication devices, computation devices, content generation devices, content consumption devices, or combinations thereof. However, as is described herein, the communication device 10 may also take the form of a communications enabled appliance, such as a thermostat configured to connect with an access point 12. Other such devices that are configured to connect to the network include, but are not limited to a refrigerator, a security system, a home lighting system, and/or the like. As such, the communication device 10 may include one or more processors that may define processing circuitry and a processing system, either alone or in combination with one or more memories. The processing circuitry may utilize instructions stored in the memory to cause the communication device 10 to operate in a particular way or execute specific functionality when the instructions are executed by the one or more processors. The communication device 10 may also include communication circuitry and corresponding hardware/software to enable communication with other devices and/or the network 14. Regardless of the type of communication device, the communication device may communicate with the network via an access point, such as a base station, a Node B, an evolved Node B (eNB), a relay node or an 802.11 or other type of access point.

The communication device 10 and a network entity, such as the access point 12, may each embody or otherwise be associated with an apparatus 20 that is generally depicted in FIG. 2 and that may be configured to perform various operations in accordance with an example embodiment of the present invention as described below, such as in conjunction with FIGS. 3 and 5 from the perspective of a TXOP requestor, FIGS. 4, 6, and 8 from the perspective of a TXOP responder, and FIG. 7 describing operations of both the TXOP requestor and TXOP responder. However, it should be noted that the components, devices or elements described below may not be mandatory and thus some may be omitted in certain embodiments. Additionally, some embodiments may include further or different components, devices or elements beyond those shown and described herein.

As shown in FIG. 2, the apparatus 20 may include or otherwise be in communication with a processing system including, for example, processing circuitry 22 that is configurable to perform actions in accordance with example embodiments described herein. The processing circuitry may be configured to perform data processing, application execution and/or other processing and management services according to an example embodiment of the present invention. In some embodiments, the apparatus or the processing circuitry may be embodied as a chip or chip set. In other words, the apparatus or the processing circuitry may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus or the processing circuitry may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 22 may include a processor 24 and memory 26 that may be in communication with or otherwise control a communication interface 28 and, in some cases in which the apparatus is embodied by the communication device 10, a user interface 29. As such; the processing circuitry may be embodied as a circuit chip (e.g., an integrated circuit chip) configured (e.g., with hardware, software or a combination of hardware and software) to perform operations described herein. However, in some embodiments, the processing circuitry may be embodied as a portion of mobile terminal or the access point.

The user interface 29 (if implemented) may be in communication with the processing circuitry 22 to receive an indication of a user input at the user interface and/or to provide an audible, visual, mechanical or other output to the user. As such, the user interface may include, for example, a keyboard, a mouse, a joystick, a display, a touch screen, a microphone, a speaker, and/or other input/output mechanisms. The apparatus 20 need not always include a user interface. For example, in instances in which the apparatus is embodied as an access point 12, the apparatus may not include a user interface. As such, the user interface is shown in dashed lines in FIG. 2.

The communication interface 28 may include one or more interface mechanisms for enabling communication with other devices and/or networks. In some cases, the communication interface may be any means such as a device or circuitry embodied in either hardware, or a combination of hardware and software that is configured to receive and/or transmit data from/to a network 14 and/or any other device or module in communication with the processing circuitry 22, such as between the communication device 10 and the access point 12. In this regard, the communication interface may include, for example, an antenna (or multiple antennas) and support hardware and/or software for enabling communications with a wireless communication network and/or a communication modem or other hardware/software for supporting communication via cable, digital subscriber line (DSL), universal serial bus (USB), Ethernet or other methods.

In an example embodiment, the memory 26 may include one or more non-transitory memory devices such as, for example, volatile and/or non-volatile memory that may be either fixed or removable. The memory may be configured to store information, data, applications, instructions or the like for enabling the apparatus 20 to carry out various functions in accordance with example embodiments of the present invention. For example, the memory could be configured to buffer input data for processing by the processor 24. Additionally or alternatively, the memory could be configured to store instructions for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 24 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 26 or otherwise accessible to the processor. As such, whether configured by hardware or by a combination of hardware and software, the processor may represent an entity (e.g., physically embodied in circuitry—in the form of processing circuitry) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

In some examples, a transmitter identification may be included in a packet, typically in the medium access control (MAC) header, which enables a receiver to determine the transmitter's identity only after decoding the packet successfully. In an instance in which decoding of the packet is unsuccessful and because the transmitter identification was included in the MAC header of the packet, the receiver cannot send a response indicating a failed transmission (See for example 802.11.).

In cellular systems, such as a third generation (3G) cellular system, no response and/or decoding confirmation is sent either. However, a higher layer link control protocol, such as a radio link control (RLC), may be configured to indicate that a receiver is missing a packet with a certain sequence number. In such a case, the receiver may send a NACK. However this form of NACK is not based on the ability to decode a packet as described above, but is instead based on the observation of a missing packet sequence number and is therefore comparable to transmission control protocol (TCP) operation.

In further examples, a successfully decoded packet is acknowledged by its receiver through an acknowledgement (ACK) message. Alternatively or additionally, successful decoding is determined based on a cyclic redundancy code (CRC) check.

In most cases, the time of a transmission of an ACK is time synchronized with an original transmission in order to allow the transmitter to know whether the transmission was successful within a predetermined time period. This form of time synchronization enables the transmitter to identify, in an instance of multiple transmissions that are time separated, which ACK corresponds to which specific transmission.

For example, in a network, such as an 802.11 network, in an instance in which the ACK is not received within a SIFS, the transmitter may then assume that the transmission failed and thus the transmitter may cause the packet to be retransmitted. However, retransmission may not be immediately initiated, but instead the transmitter may execute an exponential back-off algorithm giving the opportunity to other stations, communication devices or the like, to seize the channel and transmit their own packets before the transmitter can retransmit the lost packet. In fact, in 802.11 the assumption is that the transmission failed, most likely, due to a collision, and the transmitter of the packet initiates its collision avoidance procedure by doubling its transmission back-off window. The transmitter will retransmit the packet when it observes the medium to be idle for a DCF Interframe Space (DIFS) time and after its back-off timer expires. Thus, synchronization between a transmission and its retransmission is completely lost. This may lead to a situation where each transmission (original and all re-transmissions) is independent and the receiver is unable to utilize information received in a first transmission to decode the packet correctly in its re-transmission. Even if a receiver knew the identity of the transmitter, the receiver would have no way to know when the original packet will be retransmitted, and it would have to store the partially received packet in its buffer for a potentially large amount of time.

Therefore, GB Patent Application No. 1209156.7, filed 24 May 2012, the entire contents of which is incorporated by reference herein, discloses an example of a HARQ operation in contention based channels and is applicable, for instance, for DCF operation or random access. However, the HARQ protocol can also be valuable when a given transmitter has seized the channel to transmit multiple packets over a given period of time, as is the case for example, in TXOP operation.

During TXOP operation, the receiver's activity is reduced by introducing a Block ACK message where a receiver acknowledges all the packets transmitted by the TXOP holder by using a single feedback comprising a bitmap instead of acknowledging each packet separately after SIFS. Accordingly, in the current TXOP procedure, the time needed to complete the transmission of N packets can be calculated as:

$$\sum_{i=1}^{N} DATA_i * T \times Time_i + SIFS * N + BLOCK\_ACK\_N\_T \times Time_{BLOCK\_ACK}$$

where the first terms corresponds to the time it takes to send all N data packets, the second term corresponds to the interframe space times after consecutive packet transmissions before the transmission of the Block ACK, and the last term corresponds to the time for the Block ACK of N packets to be transmitted. However, when a hybrid retransmission scheme is introduced, the actual transmission time needed cannot be calculated as accurately. This is due to fact that if BLER is around 10% on the average, with 10 packets to be transmitted there is, on average, one packet to be retransmitted. However, this is a long term average, and there may be times where retransmission is not needed at all and times where more than one packet needs to be retransmitted. If the TXOP duration is always calculated by taking into account the statistical average re-transmission probability, the TXOP may too long in many situations and resources will be wasted. In other occasions, the duration may be too short, and there will not be sufficient time in a TXOP to perform all the retransmissions.

To get the full benefit of HARQ in a WLAN environment, the TXOP must support HARQ in HCF without this inefficiency.

In current 802.11-based HCF networks, a STA requests the HC for TXOPs, both for its own transmission as well as for the transmissions of the AP. The request may be accepted or rejected by the HC. If the TXOP is accepted, the HC will schedule transmissions both for the AP and the non-AP STA. The AP can obtain the TXOP directly from its collocated HC for its own transmissions. To request a TXOP, a STA uses the Quality of Service (QoS) control field in a QoS data frame or in a QoS Null frame. This field may indicate the duration for which the TXOP is requested (TXOP Duration Requested subfield) or the Queue Size subfield along with a Traffic Identifier (TID). Whether an AP can process a TXOP request or not is indicated in a beacon frame, an association response frame, a reassociation response frame, or in a probe response frame. In HCCA, the HC may command the AP to poll a TXOP by sending a QoS+CF-Poll frame to the STA. This type of TXOP is called a polled TXOP.

For transmissions from the STAs, the AP polls the STAs based on the parameters chosen by the STA during initiation of the TXOP. The number of transmissions inside a TXOP is restricted by the TXOP limit, which specifies the duration for which the TXOP will be granted. This field has 8 bits in QoS data frames, each of which has a unit of 32 µs. Accordingly, the durations that can be obtained inside a TXOP range between 32 µs and 8160 µs, with increments of 32 µs. A TXOP limit value equal to 0 means that a single Message Protocol Data Unit (MPDU) or a QoS Null frame will be transmitted during the TXOP. The AP may use the QoS queue size information field of the STA for a given Access Class (AC) to obtain the size of the TXOP that it will give to the STA for frames of this particular AC. The actual duration of the TXOP is given by the TXOP Duration Requested subfield that is sent by a STA to indicate the amount of time it estimates it needs for its next TXOP.

The TXOP Duration Requested subfield is present in QoS data and QoS data+CF-Ack frames sent by STAs associated in a BSS with bit 4 of the QoS Control field equal to 0. The TXOP Duration Requested subfield is an 8-bit field that indicates the duration, in units of 32 µs, that the sending STA determines it needs for its next TXOP for the specified TID. A value of 0 indicates that no TXOP is requested for the specified TID in the current scheduling request. A nonzero value represents a duration in the range of 32 µs to 8160 µs in increments of 32 µs.

In one embodiment, the AP may indicate in a beacon frame that it supports HARQ with TXOP with additional parameters. This may be coded as a new information element field in the beacon frame body, through one or more bits of information, or coded in the QoS Info element as shown in FIGS. 9b and 9c. This may include information regarding the maximum number of HARQ processes that can be supported, the supported MCS(s), HARQ algorithm type, etc. Additionally, this new information can be included in Probe Response, Association Response, FILS Discovery (801.11ai), and Short Beacon (802.1 lah) frames. The bit indicating the HARQ support can be called the "HARQ support" bit as shown e.g., in FIGS. 9b, 9c and 10b. For instance, the reserved bit B6 of the QoS Info field when sent by an AP in 802.11 version 2012 (shown in FIG. 9a) can be used to indicate the HARQ support and the presence of an additional information element containing HARQ capability as shown in FIG. 9b. Alternatively, the reserved bit B6, now used for signaling HARQ support, can be used to indicate that the frame is extended by one or more bytes (as needed) as shown in FIG. 9c.

Similarly, the STA can indicate in the Association Request that it supports HARQ with TXOP. This can be indicated through the QoS Capability field in the Association Request and in particular through the QoS Info field. When the QoS Info field is sent by a non-AP STA HARQ, support and capability can be indicated by e.g., appending one or more bytes at the end of the QoS Info field of the existing 802.11 version 2012 (FIG. 10a) as shown in FIG. 10b. (The frame format of the QoS Capability field as is currently in the 802.11 version 2012 is shown in FIG. 11).

Referring now to FIG. 3, operations performed by a method, apparatus and computer program product of an example embodiment are illustrated from the perspective of an apparatus 20 that may be embodied by or otherwise associated with a TXOP requestor, such as communication device 10, or access point 12. In an instance in which a communication device desires a HARQ TXOP, the apparatus may include means, such as the processing circuitry 22, the processor 24, or the like, for adding a transmission type identifier to a TXOP request packet, wherein the transmission type identifier includes one or more bits indicating a request for either HARQ operation or for non-HARQ operation. See block 30 of FIG. 3. In one example embodiment, TXOP HARQ indication can be indicated as a separate information element in the MAC header. In some embodiments the HARQ info may be included in the QoS Control field or the payload.

The apparatus may further include means, such as communication interface 28, or the like, for transmitting the TXOP request packet to a TXOP responder, for example, a network entity such as access point 12 or the like. See block 32 of FIG. 3. In some embodiments, the transmission may be a Request To Send (RTS) frame, such as those shown in FIGS. 13-15, discussed below. Alternatively, the transmission may be contained in a QoS data frame, such as a CF-Poll frame or a mesh data frame, as discussed below with respect to FIGS. 12a and 12b.

The apparatus may further include means, such as processing circuitry 22, processor 24, communication interface 28, or the like, for receiving a subsequent transmission from the TXOP responder indicating acceptance or rejection of the request. In some embodiments, the TXOP responder may instead indicate a modified acceptance of the request, as discussed below with respect to FIG. 4. See block 34 of FIG. 3.

In an embodiment in which the subsequent transmission rejects the request, the apparatus may optionally include means, such as processing circuitry 22, processor 24, or the like, for setting a Network Allocation Vector (NAV) based on the subsequent transmission. For example, the subsequent transmission may indicate that another device has secured an allocated TXOP duration, in which case the apparatus may sleep or remain on and can sense the channel again after the allocated TXOP duration expires. If the channel is busy at this time, the apparatus may assume that the TXOP holder has extended its allocated TXOP duration. Accordingly, in this embodiment, the apparatus may sense the channel again either at expiration of the maximum TXOP duration or at the allocated TXOP duration plus a margin. See block 36 of FIG. 3. The apparatus 20 need not always set a NAV, however. For example, in instances in which the apparatus's TXOP request is accepted, the apparatus would not set a NAV. As such, block 36 is shown in dashed lines in FIG. 3.

Referring now to FIG. 4 from the perspective of a TXOP responder, such as communication device 10 or access point 12, which may determine whether to allocate a TXOP. The apparatus 20 embodied by the TXOP responder may include means, such as the processing circuitry 22, the processor 24, communication interface 28, or the like, for receiving a TXOP request transmission from the TXOP responder indicating a request for HARQ operation. See block 40 of FIG. 4.

The apparatus 20 embodied by the TXOP responder may further include means, such as communication interface 28, or the like, for determining whether to allocate a TXOP to the TXOP requester. In some embodiments, the TXOP responder may accept the request, reject the request, or accept a modified acceptance of the request, because several TXOP parameters may be affected by the type of TXOP. See block 42 of FIG. 4.

For instance, in some embodiments, the maximum TXOP duration may be different for HARQ and non-HARQ operations, since HARQ operations can use the channel more efficiently using a more aggressive MCS that reduces the needed transmission time. Furthermore, in HCF operation, different Access Classes (ACs) of traffic may have different TXOP duration limits that may even be different depending on whether a TXOP uses HARQ or non-HARQ operation.

Further, in some embodiments, the number of original packet transmissions in a TXOP and the number of packets included in single Block ACK may vary between HARQ and non-HARQ operations. For instance, these numbers depend on the type of TXOP. Consider that in non-HARQ operation, the duration of the whole TXOP can be used for original packet transmissions (providing for the time needed to send the Block ACK and the interframe space times). In a further embodiment, due to limitations in receiver memory, the number of packets included in a Block ACK may need to be reduced, as a receiver needs to be able to keep un-decoded and partially received packets in its memory as soft symbols for combining after receiving a re-transmission.

Therefore, in some embodiments, the number of packets that can be sent before a Block ACK will be limited by the MCS used and the receiver's memory size available for HARQ operation. Furthermore, in some embodiments, part of a HARQ TXOP may be used for original packet transmissions and part for retransmissions, since retransmissions may be more likely to take place in HARQ operation. In yet another embodiment, the starting transmission rate may depend on the type of the TXOP. For instance, in a HARQ operation, the TXOP holder may use a higher MCS than during non-HARQ operation.

Accordingly, in some embodiment of the invention, the TXOP responder may accept the TXOP request or reject it using a HARQ information element in a frame. For instance, the TXOP responder may accept the requested TXOP for HARQ operation.

Alternatively, the TXOP responder may accept the TXOP, but only for non-HARQ (normal) operation, even though HARQ operation was requested. This may happen if the responder has, for example, measured the channel quality to be very good, such that HARQ gains are marginal, or, for example, if the TXOP responder has other ongoing processing that consume its memory resources. In yet another alternative, the TXOP responder may accept the TXOP for HARQ operation, but only for a smaller TXOP duration, or with different TXOP parameters, such as the number of packets that will be acknowledged by a single Block ACK message. In another alternative, the TXOP responder may accept the TXOP for non-HARQ operation and for a smaller TXOP duration. Of course, the TXOP responder may also reject the TXOP request.

In one embodiment where the TXOP responder accepts the TXOP request, the TXOP responder may use 3 bits to indicate the type of TXOP granted, such as, for example, the following:

000: TXOP responder may accept the TXOP for HARQ operation
001: TXOP responder may accept the TXOP for non-HARQ (normal) operation even though HARQ operation was requested
010: The TXOP responder may accept the TXOP for HARQ operation but for a smaller TXOP duration
011: TXOP responder may accept the TXOP for normal operation but for a smaller TXOP duration
100: The TXOP responder may reject the TXOP
101: Reserved (E.g., to accept or reject normal TXOP request)
110: Reserved (E.g., to accept or reject normal TXOP request)
111: Reserved (E.g., to accept or reject normal TXOP request)

In another embodiment, the type of TXOP granted can also be sent in the QoS Control field as modified for HARQ operation.

Referring back to FIG. 4, the apparatus 20 embodied by the TXOP responder may further include means, such as communication interface 28, or the like, for transmitting a response to the TXOP requestor. See block 44 of FIG. 4. In some embodiments, the transmission may be a Clear To Send (CTS) frame, such as those shown in in FIGS. 13-15, discussed below. Alternatively, the transmission may be contained in a QoS data frame, such as a CF-Poll frame or a mesh data frame, as discussed below with respect to FIGS. 12*a*, and 12*b*.

Referring now to FIG. 5, alternative operations performed by a method, apparatus and computer program of an example embodiment are illustrated from the perspective of an apparatus 20 that may be embodied by or otherwise associated with a TXOP requestor, such as communication device 10 or access point 12. As described with respect to block 30 of FIG. 3, in some embodiments, the apparatus may include means, such as the processing circuitry 22, the processor 24, or the like, for adding a transmission type identifier to a TXOP request packet, wherein the transmission type identifier includes one or more bits indicating a request for either HARQ operation or for non-HARQ operation. See block 50 of FIG. 5.

In addition, the apparatus may include means, such as the processing circuitry 22, the processor 24, or the like, for adding a size identifier to a TXOP request packet, wherein the size identifier includes one or more bits indicating a requested TXOP duration. See block 52 of FIG. 5. In some embodiments, the size of the TXOP is given in terms of the maximum TXOP duration. In other embodiments it is given in terms of the maximum TXOP duration and margin values. Since the maximum TXOP duration for a given class is known at both parties, this information may be omitted and only the margins can be sent under the understanding that they are decreasing the maximum duration by the value of the margin. In other embodiments, the size of the TXOP is given in terms of the current TXOP duration and the margin value(s). In other embodiments, the TXOP duration can be given through an arbitrary value that is less than the maximum TXOP duration. This information regarding the duration of the TXOP may be added to the QoS Control field or may be located in a separate information element that is related to HARQ operation. In this regard, to indicate the size of the requested TXOP duration, the TXOP requester of one embodiment can use signaling to indicate this in a TXOP request. This can be in the QoS Control field or elsewhere. For example, 1 or more bits can be used for this reason. For instance:

0: Maximum TXOP Duration is requested

1: Smaller Duration is Requested where this smaller duration value can be prespecified through one of the embodiments above.

In one embodiment, assuming that the TXOP responder knows the value of the maximum TXOP duration for the particular AC type for which the TXOP is requested (e.g., AC_VO, AC_VI, etc.) and the type of the TXOP (HARQ or non-HARQ), a two-bit size identifier may be sufficient if further the margin values are prespecified. For example:

00: Maximum TXOP Duration is requested

01: Smaller Duration is requested with Margin a

10: Smaller Duration is requested with Margin b

11: Smaller Duration is requested with Margin c

Alternatively, if more bits are available, the exact margin values can be also indicated. This will allow a higher flexibility in the values that the TXOP duration can take at the expense of using more bits for signaling.

In this fashion, great specificity can be included in the size identifier.

In some embodiments, Margins a, b, and c can be different margins to account for the varied potential durations that may be allocated for a TXOP. The exact values can be known and negotiated in advance. For example, in one embodiment, the margins can be specified and fixed values. Alternatively, they can be part of the QoS Info field when it is extended as shown in FIG. 9c or FIG. 10b or mentioned in a separate field (new information element or separate bits) when HARQ support is enabled in FIG. 9b. In another embodiment, the margins could depend on the measured channel conditions at the responder and the amount of traffic at the requester. If more bits are available, then instead of pre-selected Margin values, the TXOP requester may indicate an exact Margin value to the responder, such as by using three bits and assuming that each bit corresponds to a duration of 32 µs (as in the TXOP duration field). In this manner, the TXOP requester may request to prolong its TXOP up to 7×32=224 µs.

Similarly to block 32 of FIG. 3, in one embodiment illustrated in FIG. 5, the apparatus may further include means, such as communication interface 28, or the like, for transmitting the TXOP request packet to a TXOP responder, for example, a network entity such as access point 12 or the like. See block 54 of FIG. 5. Further, the apparatus may include means, such as processing circuitry 22, processor 24, communication interface 28, or the like, for receiving a subsequent transmission from the TXOP responder indicating acceptance, modified acceptance, or rejection of the request. In embodiments in which the subsequent transmission indicates acceptance or modified acceptance of the request, the subsequent transmission may also indicate an allocated TXOP duration. See block 56 of FIG. 5. In some embodiments, the allocated TXOP duration may be equal to or smaller than the requested TXOP duration.

In an embodiment in which the subsequent transmission rejects the request, the apparatus may optionally include means, such as processing circuitry 22, processor 24, or the like, for setting a Network Allocation Vector (NAV) based on the subsequent transmission. For example, the subsequent transmission may indicate that another device has secured an allocated TXOP duration, in which case the apparatus may sleep or remain on and can sense the channel again after the allocated TXOP duration expires. If the channel is busy at this time, the apparatus may assume that the TXOP holder has extended its allocated TXOP duration. Accordingly, in this embodiment, the apparatus may sense the channel again either at expiration of the maximum TXOP duration or at the allocated TXOP duration plus a margin. See block 58 of FIG. 5. The apparatus 20 need not always set a NAV, however. For example, the apparatus whose TXOP request is accepted would not set a NAV. However, other apparatus contending for the channel without success (and not participating to the data transfer during TXOP) would set a NAV accordingly, allowing them to sleep during the TXOP duration. As such, block 58 is shown in dashed lines in FIG. 5.

Referring now to FIG. 6, alternative operations performed by a method, apparatus and computer program product of an example embodiment are illustrated from the perspective of an apparatus 20 embodied by a TXOP responder, such as communication device 10 or access point 12, which may include means, such as communication interface 28, or the like, for receiving a TXOP request packet from a TXOP requestor indicating a request for HARQ operation. As described with respect to block 50 of FIG. 5, in some embodiments, the apparatus may include means, such as the processing circuitry 22, the processor 24, communication interface 28, or the like, for receiving a TXOP request packet from a TXOP requestor indicating a request for HARQ operation. See block 60 of FIG. 6.

Similarly to block 52 of FIG. 5, in one embodiment illustrated in FIG. 6, the apparatus may further include means, such as the processing circuitry 22, the processor 24, or the like, for determining whether to allocate a TXOP to the TXOP requestor. See block 62 of FIG. 6.

In one embodiment, the apparatus may further include means, such as the processing circuitry 22, the processor 24, or the like, for determining a TXOP duration to allocate to the TXOP requestor. See block 64 of FIG. 6. In this regard, in some embodiments, the TXOP duration accepted by the TXOP responder may be the maximum TXOP duration, in which case the TXOP is released after completion of data exchange. For example, a TXOP responder may allocate the maximum TXOP duration if the TXOP requester requests the maximum TXOP duration for the class of traffic it wants to transmit and the TXOP Responder (e.g., the AP) grants the request. Allocation of the maximum TXOP duration corresponds to an aggressive way of obtaining the channel, and the actual time that the channel will be needed can often be much shorter. In some other embodiments, a smaller TXOP duration than the maximum may initially be granted. A smaller TXOP duration may be accepted if, for example, the TXOP requester requests a smaller than the maximum TXOP duration and the TXOP responder grants that duration. Alternatively, a smaller TXOP duration may be accepted if the TXOP requester requests the maximum duration but the TXOP responder only grants the channel for a smaller duration. In this fashion, allocation of a TXOP duration smaller than the maximum TXOP duration corresponds to a conservative method of obtaining the channel.

Referring back to FIG. 6, the apparatus may further include means, such as communication interface 28, or the like, for transmitting a response to the TXOP requestor, such as communication device 10, or the like. See block 66 of FIG. 6.

Additionally, in an embodiment in which the TXOP duration and the maximum TXOP duration are both indicated in the QoS Control field (e.g., as in FIG. 4b) then the rest of the STAs can use this information to set their Network Allocation Vectors (NAVs). If an allocated TXOP Duration is smaller than the maximum TXOP duration, the STAs set their NAV to the allocated TXOP duration. During the allocated TXOP duration they can sleep or remain on and can sense the channel again after the allocated TXOP duration expires. If they find the channel busy, they assume that the TXOP holder has extended its allocated TXOP duration. In this embodiment, the STAs will sense again the channel either at expiration of the maximum TXOP duration or at the TXOP duration plus a margin.

Having described operations performed by example communication devices, additional operations performed by a method, apparatus and computer program product of an example embodiment are illustrated with reference to FIG. 7. In an instance in which a HARQ TXOP is granted, the TXOP requestor becomes a TXOP holder, and may further include means, such as communication interface 28, or the like, for transmitting data packets to the TXOP responder for a TXOP duration allocated by the TXOP responder using the transmission type indicated in the subsequent transmission. See block 70 of FIG. 7. The apparatus embodied by the TXOP holder may further include means, such as processing circuitry 22, processor 24, or the like embodiment, to determine if the transmission has been completed before the end of the allocated TXOP duration. See block 72 of FIG. 7. If less time is needed for the actual transmissions (and any needed retransmissions) than the allocated TXOP duration, the TXOP holder may send a message to end the TXOP (e.g., a CF-End or a short CF-End, as in GB Patent Application No. 1219044.3, filed 23 Oct. 2012, the entire contents of which is incorporated by reference herein) and release the channel. See block 74 of FIG. 7. However, in an instance in which the transmission is complete, but the TXOP duration is about to expire, the TXOP holder need not send a message to release the TXOP and can instead simply wait for it to expire (e.g., if a few milliseconds of the duration are left, it may not make sense to send a frame to release it). However, if the transmission has not been completed before the end of the allocated TXOP duration, the apparatus may include means, such as the processing circuitry 22, the processor 24, communication interface 28, or the like, for transmitting a request to the TXOP responder to extend the allocated TXOP duration. For instance, a TXOP holder may decide it needs more time for its transmissions, both in an example case where all packets go through successfully and the block ACK is received with all ones in the bitmap, as well as in an example case where some packets fail and require retransmission. See block 76 of FIG. 7. However, in some embodiments, a request to extend the allocated TXOP duration is not separately transmitted by the TXOP holder. As such, block 76 is shown in dashed lines in FIG. 7. The apparatus embodied by the TXOP responder may include means, such as processing circuitry 22, processor 24, communication interface 28, or the like, for transmitting a Block ACK to the TXOP holder indicating a margin by which to extend the allocated TXOP duration. See block 78 of FIG. 7. In other embodiments, the TXOP responder may not transmit a block ACK extending the allocated TXOP duration, in which case the TXOP holder must relinquish the channel. See arrow from Block 76 to End in FIG. 7.

Referring now to FIG. 8 from the perspective of a TXOP responder, with which the TXOP holder is in communication, which may determine whether to extend an allocated TXOP duration. For instance, the apparatus 20 embodied by the TXOP responder may include means, such as the processing circuitry 22, the processor 24, or the like, for determining that the allocated TXOP duration has expired. See block 80 of FIG. 8. In some embodiments, this may be prompted in some embodiments by a TXOP responder receiving a request to extend the allocated TXOP duration from a TXOP holder, such as in block 76 of FIG. 7, described above. In an instance in which the allocated TXOP duration has expired, the apparatus 20 may further include means, such as the processing circuitry 22, the processor 24, or the like, for determining if there are more packets to transmit. See block 81 of FIG. 8. If there are no more packets to transmit, the channel is released. Once a decision to release the channel is made, all undelivered packets must be discarded. Moreover, once the channel is released by the TXOP holder, other STAs, and/or the AP, may use the channel for their transmissions.

In an instance in which the allocated TXOP duration has expired but there are more packets to transmit, the apparatus 20 may further include means, such as the processing circuitry 22, the processor 24, or the like, for determining if the maximum TXOP duration has been allocated. See block 82 of FIG. 8. In one embodiment, the maximum TXOP duration is determined based on the AC type and whether the TXOP is a HARQ or non-HARQ operation. In one embodiment, the maximum TXOP duration cannot be exceeded and the channel must be released upon expiration of the maximum TXOP duration. However, in other embodiments, the apparatus 20 may further include means, such as the processing circuitry 22, the processor 24, or the like, for determining whether to extend the TXOP duration for retransmissions even if the maximum TXOP duration would be exceeded. For instance, if more time is needed than the maximum TXOP duration, the maximum TXOP duration can be exceeded to complete any needed retransmissions. In this embodiment, the TXOP responder may extend the TXOP through a Block ACK. However, in one embodiment, only a certain number of retransmissions may be allowed even in this situation, after which the channel must be released. Accordingly, if it is determined not to extend for any additional retransmissions, the channel is released. See block 84 of FIG. 8.

In an instance in which the apparatus determines that the TXOP duration shall be extended, the TXOP duration may be extended through a Block ACK under certain circumstances. For instance, upon expiration of the time for which the channel is granted, the TXOP holder needs more time to send its packets or if some packet transmissions have failed, the TXOP duration may be extended by a certain margin. In such an instance, the apparatus may further include means, such as the processing circuitry 22, the processor 24, or the like, for determining a margin of extension. See block 86 of FIG. 8. In some embodiments, the margin may be set such that the maximum duration is not exceeded in an extension, to prevent the TXOP holder from monopolizing the channel. In one such embodiment, in an instance in which extending the allocated TXOP by a first margin would result in a duration greater than the maximum TXOP duration, the determined margin of extension may be set such that the total allocated TXOP duration is equal to the maximum TXOP duration. Additionally, the TXOP holder may request an extension, in which case the TXOP responder may allocated the requested TXOP duration provided that the maximum TXOP duration is not exceeded. Alternatively, the TXOP responder may itself extend the TXOP duration even if the TXOP holder does not transmit a request. In any event, extension of the TXOP by the margin can occur sequentially until the maximum TXOP duration is reached. As disclosed above, in some embodiments the maximum TXOP duration cannot be exceeded and the channel must be released upon expiration of the maximum TXOP duration. In other embodiments, the maximum TXOP duration can be exceeded to complete needed retransmissions. Even in some of the latter embodiments, however, only a certain number of retransmissions are allowed.

As noted above, in some embodiments, a new Block ACK frame is created to indicate whether the allocated TXOP duration must be extended or not. Optionally, the duration of the extension can be given through a margin value. The margin value may be set based on a pre-specified number of re-transmissions, a pre-specified time interval, or through an arbitrary number corresponding to a number of re-transmissions or time. For instance, the apparatus may further include means, such as the processing circuitry 22, the processor 24, communication interface 29, or the like, for transmitting a block acknowledgement to a communication device extending its allocated TXOP duration by a margin. See block 88 of FIG. 8.

FIG. 18 illustrates an example of a modified Block ACK for HARQ TXOP. The new Block ACK frame has a bit that indicates whether the current TXOP must be extended and if so by how much (an optional field). One bit can be used to indicate a TXOP extension. For example:
    0: No extension
    1: Extension
If an additional amount of extension needs to be indicated then, for example, two bits can be used, as follows:
    00: No extension
    01: Extension by Margin a
    10: Extension by Margin b
    11: Extension by Margin c
The type of the new Block ACK frame can be indicated through the reserved values of the type and subtype fields. For example:
    Type B3 B2=01 (Control) and subtype B7 B6 B5 B4=0000-0110
    Type B3 B2=11 and subtype B7 B6 BS B4=0000-1111
Currently, type B3 B2=01 (Control) and subtype B7 B6 BS B4=1001 indicates a normal Block ACK.

In some embodiments, the size of the new Block ACK will be increased by one or more bytes depending on implementation. For example, in embodiments in which the margin takes pre-specified values (e.g., Margin a, b, or c), then 1 byte may be enough. Alternatively, in embodiments in which the margin needs to be explicitly indicated through a number, then more than 1 byte may be needed. In any event, the MCS chosen for a block ACK in a HARQ TXOP should be chosen such that the Block ACK is guaranteed to be received by the TXOP holder.

In another embodiment, the TXOP holder may send an indication to change the HARQ TXOP into a normal TXOP. The TXOP holder may indicate its wish to change the HARQ TXOP to a normal TXOP using a message, which can be part of the HARQ information element or part of the QoS Control information element. For instance, normal operation may be preferable if the channel conditions become exceptionally good. In some embodiments, there is no need to inform the rest of the STAs about this change, thus the transmitter and receiver addresses of such a message may be the address of the TXOP holder and receiver. Alternatively, however, the message may use the group address as is the case, for example, for a CF-End message.

In one embodiment during EDCA TXOP, CF-Poll transmissions (e.g., CF-Poll (no data), Data+CF-Poll, QoS Data+CF-Poll, QoS CF-Poll, etc.) may be sent to determine if a TXOP responder accepts HARQ operations.

FIGS. 19a and 19b illustrate example embodiments of Block ACK negotiation frames. The parameters used in HARQ with Block ACK can be negotiated by using an add Block Acknowledgement (ADDBA) Request-Response frame exchange in advance of actual TXOP operation. This is included by extending the ADDBA Request and response frames Action field format by adding order 8 after the Groupcast with Retries (GCR) Group Address element, as shown in FIGS. 19a and 19b respectively.

With reference to FIGS. 13-15, in some embodiments, the actual TXOP reservation with HARQ negotiation can be completed using a Request To Send (RTS)-Clear To Send (CTS) frame exchange. RTS-CTS transmission is used to negotiate and configure HARQ protocol by including a HARQ info field in the RTS (along the lines of an EDCA TXOP). In one embodiment, the HARQ Info field contains at least the number of HARQ processes which define the maximum number of packets being transmitted before acknowledgements received in Block ACK (maximum number of pending unacknowledged packets) for the particular TXOP (this number will be less or equal than the maximum number of HARQ processes advertised in the QoS Info field, and can depend on the traffic class, STA type, etc., as discussed above), and the maximum size of a single packet, which, together with the number of processes, defines the HARQ memory size.

FIG. 13 illustrates one example of a basic TXOP operation corresponding to EDCA. The STA can request for the TXOP through an RTS/CTS exchange with the AP. In this embodiment, HARQ TXOP parameters may be negotiated in the RTS/CTS exchange and the channel may be reserved based on the number of HARQ processes that can be active at any given time and the BLER. In the example presented in FIG. 13, it is assumed that on average one retransmission will be needed, which in this case was the actual realization of the process. In this embodiment, all the STAs will reserve the channel until the end of the retransmission. The STA after the first retransmitted packet will either continue with new transmissions of other packets or will receive an ACK from the AP. In either case, the channel will become busy after SIPS so the rest of the STAs who have set their NAVs for the TXOP hold time can update their NAVs, according to, for example, the single protection rule that protects a transmission until the end of the following data, management or response frame expanded by the overhead times.

FIG. 14 illustrates another example case where a TXOP is reserved for six packet transmissions even though only three HARQ processes can be active. In this example, the first three packet transmissions are received successfully and are acknowledged by a Block ACK. Since the TXOP hold time has not expired yet, the Block ACK can be a normal Block ACK (or a block ACK according to FIG. 18 with Extension=false). Subsequently, three more packet transmissions take place out of which packet 5 fails. In accordance with the TXOP duration extension procedures disclosed above, if the TXOP hold time is less than the maximum TXOP duration, or if is still larger than the maximum duration but not by more than a certain value, a Block ACK with an extension indication can be used to prolong the TXOP so that the failed packet(s) is(are) retransmitted.

FIG. 15 illustrates another example case where the TXOP is reserved for five packets and there can be three active HARQ processes. The first block ACK will have an extension indication to extend the TXOP.

In another embodiment, the actual TXOP reservation with HARQ negotiation can be completed using the QoS Control field and a pre-negotiated HARQ configuration. In this embodiment, to determine the type of the TXOP, an extra bit (e.g., called HARQ Enabled) can be added to indicate the type of TXOP, as shown in FIG. 12a (e.g., 0: non-HARQ operation; 1: HARQ operation). In one embodiment, this HARQ enabled bit can be part of the QoS Control field. In this case, all HARQ parameters are based on previous negotiation with e.g. ADDBA Request-Response frame exchange and a single bit is used to indicate utilization of HARQ during that TXOP.

In yet another embodiment, the actual TXOP reservation with HARQ negotiation can be completed using the QoS Control field together with a HARQ Info in a QoS packet (like in the case of HCCA TXOP) to indicate requesting of a HARQ TXOP, as shown in FIG. 12b. Similarly, the TXOP reservation with HARQ negotiation can be completed using the QoS Control field together with a HARQ Info in a QoS packet (like in the case of HCCA TXOP) to indicate signaling, as shown in FIGS. 16 and 17 (which further illustrate HARQ HCCA TXOPs in the uplink and downlink directions). For instance, in FIG. 16, HARQ capabilities are exchanged in an association procedure between an AP and a STA, after which the AP negotiates with the HC regarding potential TXOP length. Subsequently, data frames may be transmitted to the STA in a HARQ operation based on the capacities determined in the association procedure. In FIG. 17, the STA may send a QoS packet with a HARQ Info, using which the AP negotiates with the HC. During this negotiation period, the STA may conceivably contest for the channel again, but in any event, the AP may send a QoS CF-Poll frame to the STA, after which the STA may begin HARQ transmission of data frames.

In this embodiment, to determine the type of the TXOP, an extra bit (e.g., called HARQ Enabled) can be added to indicate the type of TXOP, as shown in FIG. 12a (e.g., 0: non-HARQ operation; 1: HARQ operation).

In FIG. 12a, the QoS Control Field, present in all frames in which the QoS field of the subtype is equal to 1, is illustrated for the case when HARQ is supported. In 802.11 version 2012, this field is a one-byte field. When HARQ is indicated, the QoS Control field is kept equal to 1 byte by reducing the size of the TXOP Limit from 8 to 7 bits and giving one bit to signal whether HARQ is used or not. Note that even though the maximum TXOP Limit that can now be indicated is smaller than the case of non-HARQ this problem can be overcome, in some embodiments, by changing the scaling (e.g., instead of using 32 µs scaling use a larger value). Furthermore, it is expected that, if HARQ is used, the maximum TXOP duration that is needed can be reduced due to the more aggressive MCS that HARQ enables.

In some embodiments, an indication of HARQ enablement may be present in the QoS Control element where CF-Poll type is present. The QoS Control field is always present for data frames where the QoS subfield of the subtype field is equal to 1. This is in order to be able to indicate to a STA the type of the TXOP that it is being granted. In this regard, one such embodiment may add an extra bit as shown in FIGS. 12a and 12b. In some embodiments, the bit may be one of the bits otherwise used to indicate the TXOP Limit (e.g., B8). However, because this reduces the number of bits that indicate the TXOP limit by 1, some embodiments may use methods such as scaling to combat this problem. In other embodiments, the bit may be a new bit (which increases the size of the QoS control field by one or more extra bytes). In one embodiment, the reserved bit B7 can be used for the New QoS CF-Poll and QoS CF-Ack+CF-Poll frame types. Other embodiments using the New QoS Data+CF-Poll and QoS Data+CF-Ack+ CF-Poll frame types may use a new frame, since there is no reserved bit value in the originally designed frame. In some embodiments, all data frames with subtype HARQ+QoS may include HARQ enablement to include HARQ information. For instance, the reserved values of type and subtype can be used for this new subtype. In some embodiments, all the values of type B3B2=11 and subtype B7 B6 BS B4=0000-1111 are reserved and can be used to indicate the presence of HARQ operation.

FIG. 9a illustrates an example of a QoS Info field, which is a one-byte field containing capability information. The figure corresponds to the case when the QoS Info field is sent by the AP according to the 802.11 version 2012 spec. The QoS Info field contains information regarding the EDCA Update Count which is initially set to 0 and increased by 1 every time the AC parameters change, the Q-ACK which is equal to 1 if the dot 1QAckOptionimplemented is true and zero otherwise, the Queue Request which is equal to 1 if the AP can process a non-zero Queue Size and is 0 otherwise and the TXOP Request Field which is equal to 1 if the AP can process a non-zero TXOP duration Requested field in the QoS Control field of QoS data frames and it set to zero otherwise. One reserved value is left in the QoS Info field.

In some embodiments of the invention, when HARQ is supported, a modified QoS Info Field is proposed according to FIG. 9b. Here the reserved value is used to indicate whether HARQ is enabled or not for the transmission. The details of the HARQ operation can be part of a different information field, e.g., a HARQ Info Field. In this embodiment, the QoS Info Field is still 1 byte long and the additional information is added in another Info field. As another embodiment, FIG. 9c illustrates the case where the reserved bit of the QoS Info field is used to indicate that the field will be extended to be longer than 1 byte. In this embodiment, HARQ information is included in the added bits, and the QoS Info field is longer than 1 byte.

FIG. 10a illustrates the corresponding QoS Info field when sent by the STA as in 802.11 version 2012. It contains information about the AC (takes the value 1 for the corresponding access class to indicate that it is enabled while it takes a 0 to indicate that it is not enabled). Furthermore, it includes the Max SP Length, which indicates the maximum number of total buffered units that the AP can send to a STA. Furthermore, a STA can indicate by setting the More Data Ack field equal to 1 that it can process ACK frames and stay in an awake state. In some embodiments indicating HARQ, the same options as above are used, except that completely new frames may to be introduced which have a larger size (the option to re-interpret a reserved bit is not available). One example embodiment is shown in FIG. 10b. This embodiment may be used in mesh TXOPs.

As noted above, FIGS. 3-8 are flowcharts illustrating the operations performed by a method, apparatus and computer program product, such as apparatus 20 of FIG. 2, from the perspective of the mobile terminal 10 and a network entity, such as the access point 12, respectively, in accordance with one embodiment of the present invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 26 of an apparatus employing an embodiment of the present invention and executed by a processor 24 of the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart blocks. These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks. As such, the operations of FIGS. 3-8, when executed, convert a computer or processing circuitry into a particular machine configured to perform an example embodiment of the present invention. Accordingly, the operations of FIGS. 3-8 define an algorithm for configuring a computer or processing circuitry 22, e.g., processor, to perform an example embodiment. In some cases, a general purpose computer may be provided with an instance of the processor which performs the algorithm of FIGS. 3-8 to transform the general purpose computer into a particular machine configured to perform an example embodiment.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified as described below. Moreover, in some embodiments, additional optional operations may optionally be included as shown, for example by the dashed lines in FIGS. 3, 5, and 7. It should be appreciated that each of the modifications, optional additions or amplifications below may be included with the operations above either alone or in combination with any others among the features described herein.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed is:

1. A method for use in a communication device, the method comprising:
    adding a transmission type identifier to a transmission opportunity (TXOP) request packet, wherein the transmission type identifier includes one or more bits indicating a request for either hybrid automatic repeat request (HARQ) operation or for non-HARQ operation;
    causing the communication device to transmit the TXOP request packet to a TXOP responder; and
    receiving a subsequent transmission from the TXOP responder indicating acceptance, modified acceptance, or rejection of the request.

2. The method according to claim 1, further comprising:
    adding a size identifier to the TXOP request packet, wherein the size identifier includes one or more bits indicating a requested TXOP duration.

3. The method according to claim 1, further comprising:
    causing the communication device to transmit data packets for a TXOP duration allocated by the TXOP responder using a transmission type indicated in the subsequent transmission.

4. The method according to claim 3, further comprising:
    causing the communication device to transmit a request to extend the allocated TXOP duration to the TXOP responder.

5. The method according to claim 1, wherein an allocated TXOP duration may not exceed a maximum TXOP duration determined by the TXOP responder.

6. The method according to claim 1, wherein the subsequent transmission further indicates a number of packets that the communication device may transmit to the TXOP responder before waiting to receive a block acknowledgment.

7. The method according to claim 1, wherein, in an instance in which the subsequent transmission indicated rejection of the request, the method further comprises:
    causing the communication device to set a network allocation vector (NAV) based on the subsequent transmission, the NAV identifying a period during which the communication device will not transmit packets to the TXOP responder.

8. An apparatus for use in a communication device, the apparatus comprising:
    a processing system arranged to cause the apparatus to at least:
        add a transmission type identifier to a transmission opportunity (TXOP) request packet, wherein the transmission type identifier includes one or more bits indicating a request for either hybrid automatic repeat request (HARQ) operation or for normal operation;
        cause transmission of the TXOP request packet to a TXOP responder; and receive a subsequent transmission from the TXOP responder indicating acceptance, modified acceptance, or rejection of the request.

9. The apparatus according to claim 8, wherein the processing system is further arranged to cause the apparatus to:
add a size identifier to the TXOP request packet, wherein the size identifier includes one or more bits indicating a requested TXOP duration.

10. The apparatus according to claim 8, wherein the processing system is further arranged to cause the apparatus to:
cause transmission of data packets for a TXOP duration allocated by the TXOP responder using a transmission type indicated in the subsequent transmission.

11. The apparatus according to claim 10, wherein the processing system is further arranged to cause the apparatus to:
cause transmission of a request to extend the allocated TXOP duration to the TXOP responder.

12. The apparatus according to claim 8, wherein an allocated TXOP duration may not exceed a maximum duration determined by the TXOP responder.

13. The apparatus according to claim 8, wherein the subsequent transmission further indicates a number of packets that the communication device may transmit to the TXOP responder before waiting to receive a block acknowledgment.

14. The apparatus according to claim 8, wherein, in an instance in which the subsequent transmission indicated rejection of the request, the processing system is further arranged to cause the apparatus to:
set a network allocation vector (NAV) based on the subsequent transmission, the NAV identifying a period during which the communication device will not transmit packets to the TXOP responder.

15. A non-transitory computer readable medium comprising a set of instructions which, when executed by a communication device, causes the communication device to perform the steps of:
adding a transmission type identifier to a transmission opportunity (TXOP) request packet, wherein the transmission type identifier includes one or more bits indicating a request for either hybrid automatic repeat request (HARQ) operation or for non-HARQ operation;
causing the communication device to transmit the TXOP request packet to a TXOP responder; and
receiving a subsequent transmission from the TXOP responder indicating acceptance, modified acceptance, or rejection of the request.

16. The non-transitory computer readable medium according to claim 15, further comprising instructions, which, when executed by the communication device, cause the communication device to perform the additional step of:
adding a size identifier to the TXOP request packet, wherein the size identifier includes one or more bits indicating a requested TXOP duration.

17. The non-transitory computer readable medium according to claim 15, further comprising instructions, which, when executed by the communication device, cause the communication device to perform the additional step of:
causing the communication device to transmit data packets for a TXOP duration allocated by the TXOP responder using a transmission type indicated in the subsequent transmission.

18. The non-transitory computer readable medium according to claim 17, further comprising instructions, which, when executed by the communication device, cause the communication device to perform the additional step of:
causing the communication device to transmit a request to extend the allocated TXOP duration to the TXOP responder.

19. The non-transitory computer readable medium according to claim 15, wherein the subsequent transmission further indicates a number of packets that the communication device may transmit to the TXOP responder before waiting to receive a block acknowledgment.

20. The non-transitory computer readable medium according to claim 15, wherein, in an instance in which the subsequent transmission indicated rejection of the request, further comprises instructions, which, when executed by the communication device, cause the communication device to perform the additional step of:
causing the communication device to set a network allocation vector (NAV) based on the subsequent transmission, the NAV identifying a period during which the communication device will not transmit packets to the TXOP responder.

* * * * *